(12) United States Patent
Hooks

(10) Patent No.: US 7,593,936 B2
(45) Date of Patent: Sep. 22, 2009

(54) SYSTEMS AND METHODS FOR AUTOMATED COMPUTER SUPPORT

(75) Inventor: David Eugene Hooks, Cary, NC (US)

(73) Assignee: Triumfant, Inc., Research Triangle Park, NC (US)

( * ) Notice: Subject to any disclaimer, the term of this patent is extended or adjusted under 35 U.S.C. 154(b) by 570 days.

(21) Appl. No.: 10/916,956

(22) Filed: Aug. 11, 2004

(65) Prior Publication Data

US 2005/0038827 A1 Feb. 17, 2005

Related U.S. Application Data

(60) Provisional application No. 60/494,225, filed on Aug. 11, 2003.

(51) Int. Cl.
*G06F 17/30* (2006.01)

(52) U.S. Cl. .............................. 707/6; 707/8; 707/200; 714/37

(58) Field of Classification Search ............... 707/1–10, 707/100–104.1, 200–205; 714/37; 715/530
See application file for complete search history.

(56) References Cited

U.S. PATENT DOCUMENTS

| | | | |
|---|---|---|---|
| 4,368,462 A * | 1/1983 | Crawley | 345/530 |
| 5,220,668 A | 6/1993 | Bullis | |
| 5,499,357 A | 3/1996 | Sonty et al. | |
| 5,905,988 A | 5/1999 | Schwartz et al. | |
| 6,058,102 A | 5/2000 | Drysdale et al. | |
| 6,243,702 B1 * | 6/2001 | Bamford et al. | 707/8 |
| 6,269,401 B1 | 7/2001 | Fletcher et al. | |
| 6,324,656 B1 * | 11/2001 | Gleichauf et al. | 714/37 |
| 6,363,477 B1 | 3/2002 | Fletcher et al. | |
| 6,578,077 B1 | 6/2003 | Rakoshitz et al. | |
| 6,636,851 B1 * | 10/2003 | Bamford et al. | 707/8 |
| 6,801,940 B1 | 10/2004 | Moran et al. | |
| 6,856,942 B2 | 2/2005 | Garnett et al. | |
| 6,959,265 B1 | 10/2005 | Candela et al. | |
| 7,010,607 B1 | 3/2006 | Bunton | |
| 7,013,084 B2 | 3/2006 | Battou et al. | |
| 7,020,697 B1 | 3/2006 | Goodman et al. | |
| 7,035,930 B2 | 4/2006 | Graupner et al. | |
| 7,039,705 B2 | 5/2006 | Graupner et al. | |
| 7,054,932 B2 | 5/2006 | Herrmann et al. | |
| 7,058,704 B1 | 6/2006 | Mangipudi et al. | |
| 7,065,573 B2 | 6/2006 | Byrnes | |
| 7,072,960 B2 | 7/2006 | Graupner et al. | |
| 2002/0174207 A1 | 11/2002 | Battou | |

(Continued)

OTHER PUBLICATIONS

Patent Cooperation Treaty, International Search Report, International Application No. PCT/US04/26186, mailed on Jun. 20, 2005, 4 pages.

*Primary Examiner*—Shahid A Alam
(74) *Attorney, Agent, or Firm*—Edell, Shapiro & Finnan, LLC

(57) ABSTRACT

Systems and methods for providing automated computer support are described herein. One described method includes receiving a plurality of snapshots from a plurality of computers, storing the plurality of snapshots in a data store, and creating an adaptive reference model based at least in part on the plurality of snapshots. The described method also includes comparing at least one of the plurality of snapshots to the adaptive reference model, and identifying at least one anomaly based on the comparison.

22 Claims, 16 Drawing Sheets

U.S. PATENT DOCUMENTS

| | | |
|---|---|---|
| 2003/0046260 A1* | 3/2003 | Satyanarayanan et al. ...... 707/1 |
| 2003/0046390 A1 | 3/2003 | Ball et al. |
| 2003/0182312 A1* | 9/2003 | Chen et al. ................. 707/200 |
| 2004/0015599 A1 | 1/2004 | Trinh et al. |
| 2005/0018618 A1 | 1/2005 | Mualem et al. |
| 2005/0038818 A1 | 2/2005 | Hooks |
| 2005/0038827 A1 | 2/2005 | Hooks |
| 2005/0144314 A1 | 6/2005 | Kan et al. |
| 2006/0059253 A1 | 3/2006 | Goodman et al. |
| 2006/0130142 A1 | 6/2006 | Mester et al. |
| 2006/0136720 A1 | 6/2006 | Armstrong et al. |

* cited by examiner

Manage Policy Templates

Identify the data source to be used in template creation by selecting a machine and press the "Next" button when complete. Press "Cancel" to abort the template creation/editing process. Press "Back" to go back to the previous page.

Parameters

| | |
|---|---|
| Template Name | Windows 2K SP2 Config |
| Template Creator | D. Hooks |

Values Selected

Data Source

| Customer Name | Machine Name | Date Of Last Snapshot |
|---|---|---|
| A4 Internal | ACCOUNTING1 | 3/14/2004 7:03 AM |
| A4 Internal | AGAMBLE2 | 3/14/2004 7:16 AM |
| A4 Internal | ALISON | 3/11/2004 9:03 AM |
| A4 Internal | AMY | 3/17/2004 9:02 AM |
| A4 Internal | APRILX | 3/14/2004 9:00 AM |
| A4 Internal | BDIXON | 3/14/2004 7:02 AM |
| A4 Internal | BTOLLMANN | 3/14/2004 7:20 AM |
| A4 Internal | BWALKER | 3/14/2004 7:04 AM |
| A4 Internal | BWATKINS2 | 3/14/2004 7:02 AM |
| A4 Internal | CAROLYN | 3/14/2004 9:02 AM |
| A4 Internal | CCOOPER | 3/14/2004 7:18 AM |
| A4 Internal | CHIP | 3/13/2004 9:08 AM |
| A4 Internal | CSCHICK2 | 3/14/2004 7:14 AM |
| A4 Internal | DBARKLEY | 3/14/2004 7:06 AM |
| A4 Internal | DCONNER | 3/14/2004 7:04 AM |
| A4 Internal | DEVTEST1 | 3/14/2004 7:09 AM |
| A4 Internal | DEVTEST3 | 3/14/2004 7:04 AM |
| A4 Internal | DEV_STAGE | 3/14/2004 7:13 AM |
| A4 Internal | DKOONS2 | 3/14/2004 7:03 AM |
| A4 Internal | DSTAFFORD | 3/14/2004 7:05 AM |
| A4 Internal | EMRTEST | 3/13/2004 7:28 AM |
| A4 Internal | GFRISBEE | 3/14/2004 7:21 AM |
| A4 Internal | GMORANT | 3/14/2004 7:05 AM |
| A4 Internal | HMED6 | 3/14/2004 7:04 AM |

SYSTEMS AND METHODS FOR AUTOMATED COMPUTER SUPPORT

CROSS-REFERENCE TO RELATED APPLICATIONS

This application claims the benefit of U.S. Provisional Application No. 60/494,225, filed Aug. 11, 2003, the entirety of which is hereby incorporated by reference.

FIELD OF THE INVENTION

The present invention relates generally to systems and methods for automated computer support.

BACKGROUND

As information technology continues to increase in complexity, problem management costs will escalate as the frequency of support incidents rises and the skill set requirements for human analysts become more demanding. Conventional problem management tools are designed to reduce costs by increasing the efficiency of the humans performing these support tasks. This is typically accomplished by at least partially automating the capture of trouble ticket information and by facilitating access to knowledge bases. While useful, this type of automation has reached the point of diminishing returns as it fails to address the fundamental weakness in the support model itself, its dependence on humans.

Table 1 illustrates the distribution of labor costs associated with incident resolution in the conventional, human-based support model. The data shown is provided by Motive Communications, Inc. of Austin, Tex. (www.motive.com), a major supplier of help desk software. The highest cost items are those associated with tasks that require human analysis and/or interaction (e.g. Diagnosis, Investigation, Resolution).

TABLE 1

| Support Tasks | % Labor Cost |
| --- | --- |
| Simple and Repeated Problems (30%) | |
| Desktop Configuration (User inflicted) | 4% |
| Desktop Environment (Software malfunction) | 9% |
| Networking and Connectivity | 7% |
| How To (questions) | 10% |
| Complex & Dynamic Problems (70%) | |
| Triage (Identify user and support entitlement) | 7% |
| Diagnosis (Analyze state of machine) | 11% |
| Investigation (Find the source of the problem) | 35% |
| Resolution and Repair (Walk user through the repair) | 18% |

Conventional software solutions for automated problem management endeavor to decrease these costs and add value across a wide range of service levels. Forrester Research, Inc. of Cambridge, Mass. (www.forrester.com) provides a useful characterization of these service levels. Forrester Research divides conventional automated computer support solutions into five service levels, including: (1) Mass-Healing—solving incidents before they occur; (2) Self-Healing—solving incidents when they occur; (3) Self-Service—solving incidents before a user calls; (4) Assisted Service—solving incidents when a user calls; and (5) Desk-side Visit—solving incidents when all else fails. According to Forrester, the cost per incident using a conventional self-healing service is less than one dollar. However, the cost quickly escalates, reaching more than three hundred dollars per incident if a desk-side visit is eventually required.

The objective of Mass Healing is to solve incidents before they occur. In conventional systems, this objective is achieved by making all PC configurations the same, or at a minimum, ensuring that a problem found on one PC cannot be replicated on any other PCs. Conventional products typically associated with this service level consist of software distribution tools and configuration management tools. Security products such as anti-virus scanners, intrusion detection systems, and data integrity checkers are also considered part of this level since they focus on preventing incidents from occurring.

The conventional products that attempt to address this service level operate by constraining the managed population to a small number of known good configurations and by detecting and eliminating a relatively small number of known bad configurations (e.g. virus signatures). The problem with this approach is that it assumes that: (1) all good and bad configurations can be known ahead of time; and (2) once they are known that they remain relatively stable. As the complexity of computer and networking systems increases, the stability of any particular node in the network tends to decrease. Both the hardware and software on any particular node is likely to change frequently. For example, many software products are capable of automatically updating themselves using software patches accessed over an internal network or the Internet. Since there are an infinite number of good and bad configurations and since they change constantly, these conventional self-healing products can never be more than partially effective.

Further, virus authors continue to develop more and more clever viruses. Conventional virus detection and eradication software depends on the ability to identify a known pattern to detect and eradicate a virus. However, as the number and complexity of viruses increases, the resources required to maintain a database of known viruses and fixes for those viruses combined with the resources required to distribute the fixes to the population of nodes on a network becomes overwhelming. In addition, a conventional PC utilizing a Microsoft Windows operating system includes over 7,000 system files and over 100,000 registry keys all of which are multi-valued. Accordingly, for all practical purposes, an infinite number of good states and an infinite number of bad states may exist, making the task of identifying the bad states more complicated.

The objective of the Self-Healing level is to sense and automatically correct problems before they result in a call to the help desk, ideally before the user is even aware that a problem exists. Conventional Self-Healing tools and utilities have existed since the late 80s when Peter Norton introduced a suite of PC diagnostics and repair tools (www.Symantec.com). These tools also include tools that allow a user to restore a PC to a restore point set prior to installation of a new product. However, none of the conventional tools work well under real world conditions.

One fundamental problem of these conventional tools is the difficulty in creating a reference model with sufficient scope, granularity, and flexibility to allow "normal" to be reliably distinguished from "abnormal". Compounding the problem is the fact that the definition of "normal" must constantly change as new software updates and applications are deployed. This is a formidable technical challenge and one that has yet to be conquered by any of the conventional tools.

The objective of the Self-Service level is to reduce the volume of help desk calls by providing a collection of automated tools and knowledge bases that enable end users to help themselves. Conventional Self-Service products consist of "how to" knowledge bases and collections of software solutions that automate low risk, repetitive support functions such as resetting forgotten passwords. These conventional solutions have a significant downside in that they increase the likelihood of self-inflicted damage. For this reason they are limited to specific types of problems and applications.

The objective of the Assisted Service level is to enhance human efficiency by providing an automated infrastructure for managing a service request and by providing capabilities to remotely control a personal computer and to interact with end users. Conventional Assisted Service products include help desk software, online reference materials, and remote control software.

While the products at this service level are perhaps the most mature of the conventional products and solutions described herein, they still fail to fully meet the requirements of users and organizations. Specifically, the ability of these products to automatically diagnose problems is severely limited both in terms of the types of problems that can be correctly identified as well as the accuracy of the diagnosis (often multiple choice).

A Desk-Side Visit becomes necessary when all else fails. This service level includes any "hands-on" activities that may be necessary to restore a computer that cannot be diagnosed/repaired remotely. It also includes tracking and managing these activities to ensure timely resolution. Of all the service levels, this level is most likely to require significant time from highly trained, and therefore expensive, human resources.

Conventional products at this level consist of specialized diagnostic tools and software products that track and resolve customer problems over time and potentially across multiple customer service representatives.

Thus, what is needed is a paradigm shift, which is necessary to significantly reduce support costs. This shift will be characterized by the emergence of a new support model in which machines will serve as the primary agents for making decisions and initiating actions.

SUMMARY

Embodiments of the present invention provide systems and methods for automated computer support. One method according to one embodiment of the present invention comprises receiving a plurality of snapshots from a plurality of computers, storing the plurality of snapshots in a data store, and creating an adaptive reference model based at least in part on the plurality of snapshots. The method further comprises comparing at least one of the plurality of snapshots to the adaptive reference model, and identifying at least one anomaly based on the comparison. In another embodiment, a computer-readable medium (such as, for example random access memory or a computer disk) comprises code for carrying out such a method.

These embodiments are mentioned not to limit or define the invention, but to provide examples of embodiments of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein:

FIG. 11 is a screen shot of a user interface for creating an adaptive reference model in one embodiment of the present invention;

FIG. 14 is a screen shot of a user interface for managing a recognition filter in one embodiment of the present invention;

FIG. 15 is a screen shot illustrating a user interface for selecting a "golden system" for use in a policy template in one embodiment of the present invention; and FIG. 16 is a screen shot of a user interface for selecting policy template assets in one embodiment of the present invention.

DETAILED DESCRIPTION

Figure 1:
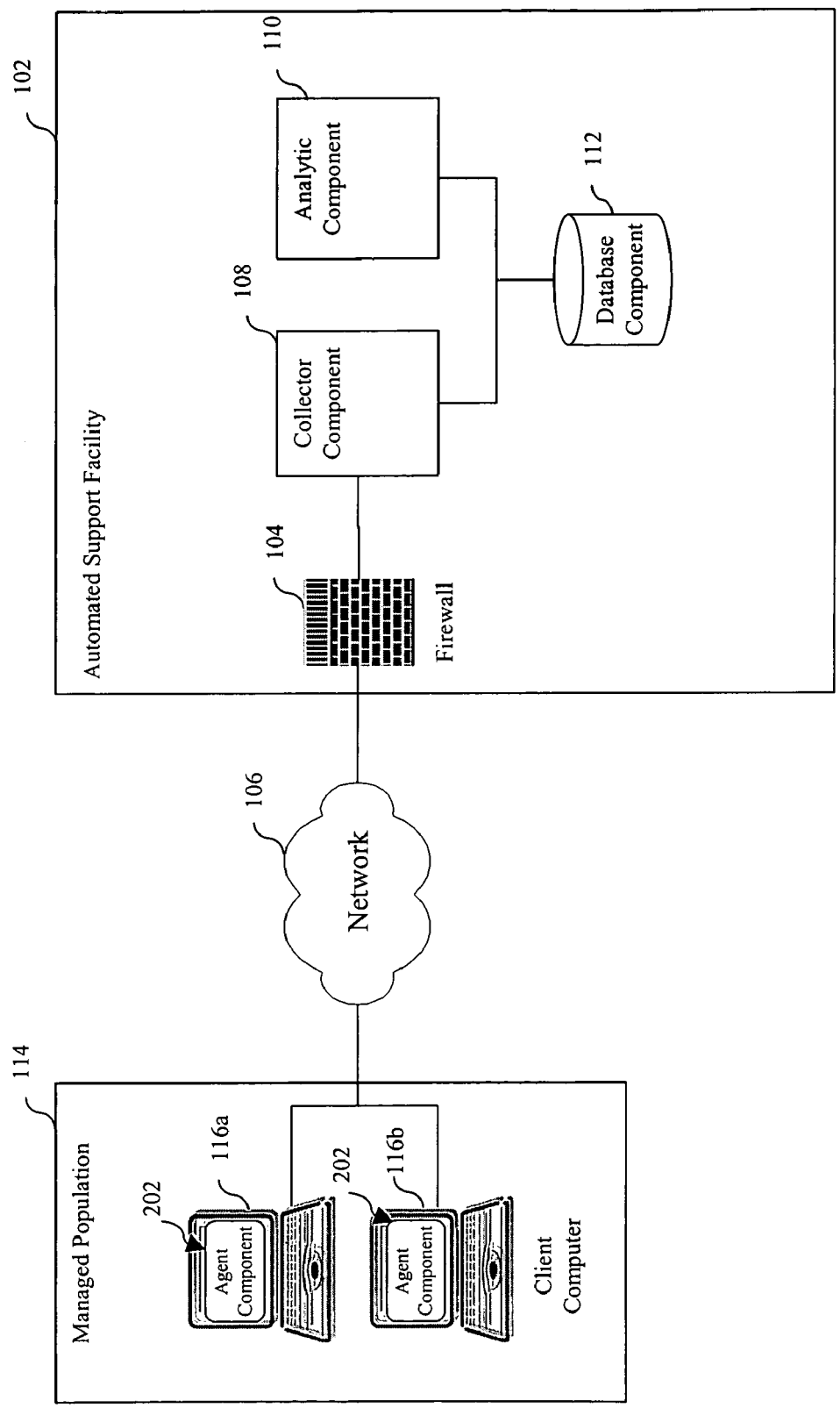
FIG. 1 illustrates an exemplary environment for implementation of one embodiment of the present invention.

Embodiments of the present invention provide systems and method for automated computer support. Referring now to the drawings in which like numerals indicate like elements throughout the several figures, FIG. 1 is a block diagram illustrating an exemplary environment for implementation of one embodiment of the present invention. The embodiment shown includes an automated support facility 102. Although the automated support facility 102 is shown as a single facility in FIG. 1, it may comprise multiple facilities or be incorporated into the site where the managed population resides. The automated support facility includes a firewall 104 in communication with a network 106 for providing security to data stored within the automated support facility 102. The automated support facility 102 also includes a Collector component 108. The Collector component 108 provides, among other features, a mechanism for transferring data in and out of the automated support facility 102. The transfer routine may use a standard protocol such as file transfer protocol (FTP) or hypertext transfer protocol (HTTP) or may use a proprietary protocol. The Collector component also provides the processing logic necessary to download, decompress, and parse incoming snapshots.

The automated support facility 102 shown also includes an Analytic component 110 in communication with the Collector component 108. The Analytic component 110 includes hardware and software for implementing the adaptive reference model described herein and storing the adaptive reference model in a Database component 112. The Analytic component 110 extracts adaptive reference models and snapshots from a Database component 112, analyzes the snapshot in the context of the reference model, identifies and filters any anomalies, and transmits response agent(s) when appropriate. The Analytic component 110 also provides the user interface for the system.

The embodiment shown also includes a Database component 112 in communication with the Collector component 108 and the Analytic component 110. The Database component 112 provides a means for storing data from the agents and for the processes performed by an embodiment of the present invention. A primary function of the Database component may be to store snapshots and adaptive reference models. It includes a set of database tables as well as the processing logic necessary to automatically manage those tables. The embodiment shown includes only one Database component 112 and one Analytic component 110. Other embodiments include many Database and or Analytic components 112, 110. One embodiment includes one Database component and multiple Analytic components, allowing multiple support personnel to share a single database while performing parallel analytical tasks.

An embodiment of the present invention provides automated support to a managed population 114 that may comprise a plurality of client computers 116a,b. The managed population provides data to the automated support facility 102 via the network 106.

In the embodiment shown in FIG. 1, an Agent component 202 is deployed within each monitored machine 116a, b. The Agent component 202 gathers data from the client 116. At scheduled intervals (e.g., once per day) or in response to a command from the Analytic component 110, the Agent component 202 takes a detailed snapshot of the state of the machine in which it resides. This snapshot includes a detailed examination of all system files, designated application files, the registry, performance counters, processes, services, communication ports, hardware configuration, and log files. The results of each scan are then compressed and transmitted in the form of a Snapshot to a Collector component 108.

Each of the servers, computers, and network components shown in FIG. 1 comprise processors and computer-readable media. As is well known to those skilled in the art, an embodiment of the present invention may be configured in numerous ways by combining multiple functions into a single computer or alternatively, by utilizing multiple computers to perform a single task.

The processors utilized by an embodiment of the present invention may include, for example, digital logic processors capable of processing input, executing algorithms, and generating output as necessary in support of processes according to the present invention. Such processors may include a microprocessor, an ASIC, and state machines. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C#, C++, Visual Basic, Java, and JavaScript.

Figure 2:
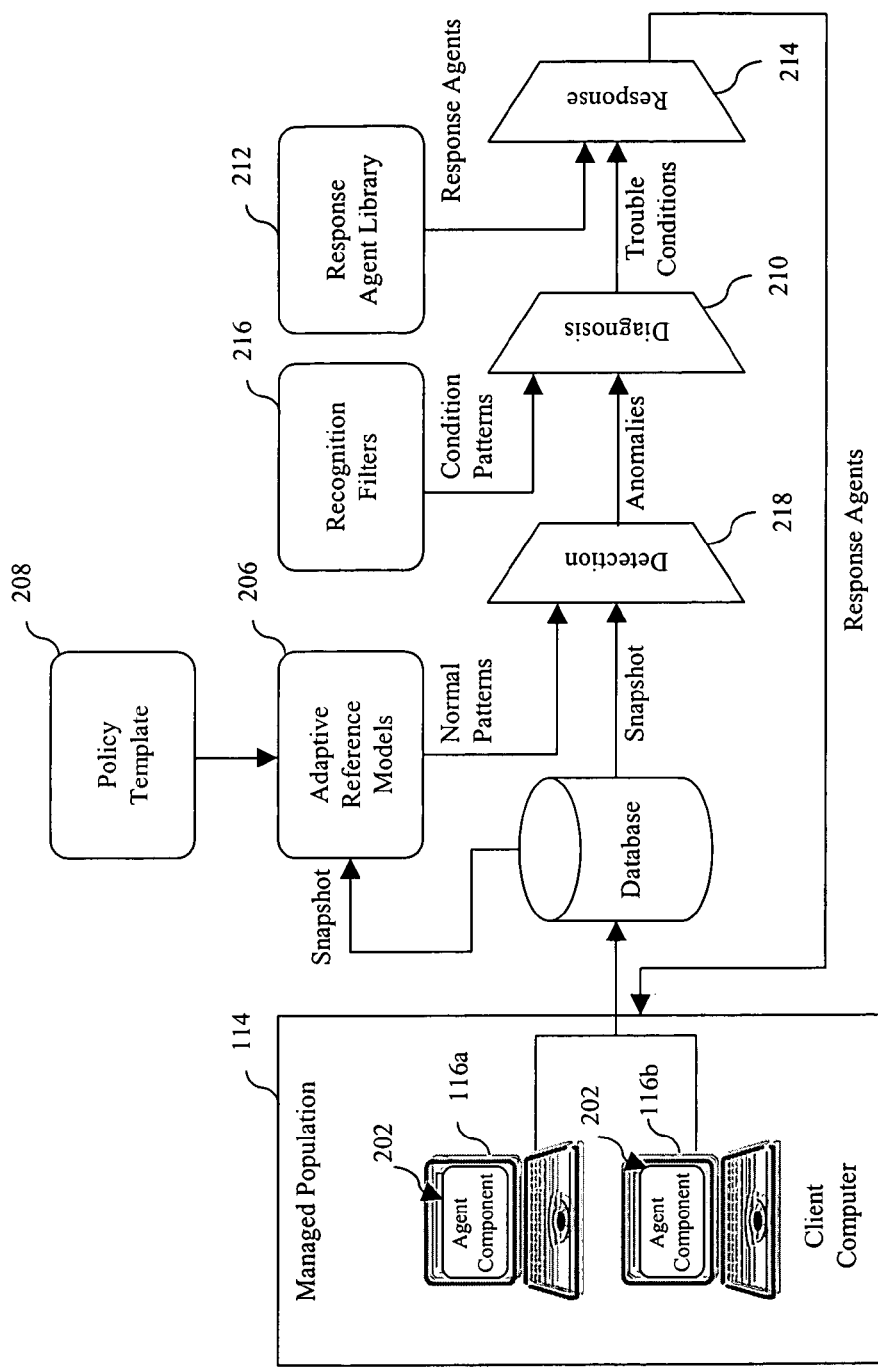
FIG. 2 is a block diagram illustrating a flow of information and actions in one embodiment of the present invention.

FIG. 2 is a block diagram illustrating a flow of information and actions in one embodiment of the present invention. The embodiment shown comprises an Agent component 202. The Agent component 202 is the part of the system that is deployed within each monitored machine. It may perform three major functions. First, it may be responsible for gathering data. The Agent component 202 may perform an extensive scan of the client machine 116a,b at scheduled intervals, in response to a command from the Analytic component 110, or in response to events of interest detected by the Agent component 202. This scan may include a detailed examination of all system files, designated application files, the registry, performance counters, hardware configuration, logs, running tasks, services, network connections, and other relevant data. The results of each scan are compressed and transmitted over network 106 in the form of a "snapshot" to the Collector component 108.

In one embodiment, the Agent component 202 reads every byte of files to be examined and creates a digital signature or hash for each file. The digital signature identifies the exact contents of each file rather than simply providing metadata, such as the size and the creation date. Some conventional viruses change the file header information in an attempt to fool systems that rely on metadata for detection. Such an embodiment is able to successfully detect such viruses.

The scan of the client by the Agent component 202 may be resource intensive. In one embodiment, a full scan is performed periodically, e.g., daily, during a time when the user is not using the client machine. In another embodiment, the Agent component 202 performs a delta-scan of the client machine, logging only the changes from the last scan. In another embodiment, scans by the Agent component 202 are executed on demand, providing a valuable tool for a technician or support person attempting to remedy an anomaly on the client machine.

The second major function performed by the agent 202 is that of behavior blocking. The agent 202 constantly (or substantially constantly) monitors access to key system resources such as system files and the registry. It is able to selectively block access to these resources in real time to prevent damage from malicious software. While behavior monitoring occurs on an ongoing basis, behavior blocking is enabled as part of a repair action. For example, if the Analytic component 110 suspects the presence of a virus, it can download a repair action to cause the client to block the virus from accessing key information resources within the managed system. The client component 202 provides information from the monitoring process as part of the snapshot.

The third major function performed by the Agent component 202 is to provide an execution environment for response agents. Response agents are mobile software components that implement automated procedures to address various types of trouble conditions. For example, if the Analytic component 110 suspects the presence of a virus, it can download a response agent to cause the Agent component 202 to remove the suspicious assets from the managed system. The Agent component 202 may run as a service or other background process on the computer being monitored. Because of the scope and granularity of information provided by an embodiment of the present invention, repair can be performed more accurately than with conventional systems. Although described in terms of a client, the managed population 114 may comprise PC's workstations, servers, or any other type of computer.

The embodiment shown also includes an adaptive reference model component 206. One difficult technical challenge in building an automated support product is the creation of a reference model that can be used to distinguish between normal and abnormal system states. The system state of a modern computer is determined by many multi-valued variables and consequently there are virtually a near-infinite number of normal and abnormal states. To make matters worse these variables change frequently as new software updates are deployed and as end users communicate. The adaptive reference model 206 in the embodiment shown analyzes the snapshots from many computers and identifies statistically significant patterns using a generic data mining algorithm or a proprietary data mining algorithm designed specifically for this purpose. The resulting rule set is extremely rich (hundreds of thousands of rules) and is customized to the unique characteristics of the managed population. In the embodiment shown, the process of building a new reference model is completely automatic and can be executed periodically to allow the model to adapt to desirable changes such as the planned deployment of a software update.

Since the adaptive reference model 206 is used for the analysis of statistically significant patterns from a population of machines, in one embodiment, a minimum number of machines are analyzed to ensure the accuracy of the statistical measures. In one embodiment, a minimum population of approximately 50 machines is tested to achieve systemically relevant patterns for analysis of the machines. Once a reference is established, samples can be used to determine if anything abnormal is occurring within the entire population or any member of the population.

In another embodiment, the Analytic component 110 calculates a set of maturity metrics that enable the user to determine when a sufficient number of samples have been accumulated to provide accurate analysis. These maturity metrics indicate the percentage of available relationships at each level of the model that have met predefined criteria corresponding to various levels of confidence (e.g. High, Medium, and Low). In one such embodiment, the user monitors the metrics and ensures that enough snapshots have been assimilated to create a mature model. In another such embodiment, the Analytic component 110 assimilates samples until it reaches a predefined maturity goal set by the user. In either such embodiment, it is not necessary to assimilate a certain number of samples (e.g. 50).

The embodiment shown in FIG. 2 also comprises a Policy Template component 208. The Policy Template component 208 allows the service provider to manually insert rules in the form of "policies" into the adaptive reference model. Policies are combinations of attributes (files, registry keys, etc.) and values that when applied to a model, override a portion of the statistically generated information in the model. This mechanism can be used to automate a variety of common maintenance activities such as verifying compliance to security policies and checking to ensure that the appropriate software updates have been installed.

When something goes wrong with a computer, it often impacts a number of different information assets (files, registry keys, etc.). For example, a "Trojan" might install malicious files, add certain registry keys to ensure that those files are executed, and open ports for communication. The embodiment shown in FIG. 2 detects these undesirable changes as anomalies by comparing the snapshot from the infected machine with the norm embodied in the adaptive reference model. An anomaly is defined as an unexpectedly present asset, an unexpectedly absent asset, or an asset that has an unknown value. Anomalies are matched against a library of Recognition Filters 216. A Recognition Filter 216 comprises a particular pattern of anomalies that indicates the presence of a particular root cause condition or a generic class of conditions. Recognition Filters 216 also associate conditions with a severity indication, a textual description, and a link to a response agent. In another embodiment, a Recognition Filter 216 can be used to identify and interpret benign anomalies. For example, if a user adds a new application that the administrator is confident will not cause any problems, the system according to the present invention will still report the new application as a set of anomalies. If the application is new, then reporting the assets that it adds as anomalies is correct. However, the administrator can use a Recognition Filter 216 to interpret the anomalies produced by adding the application as benign.

In an embodiment of the present invention, certain attributes relate to continuous processes. For example, the performance data are comprised of various counters. These counters measure the occurrence of various events over a particular time period. To determine if the value of such a counter is normal across a population, one embodiment of the present invention computes a mean and standard deviation. An anomaly is declared if the value of the counter falls more than a certain number of standard deviations away from the mean.

In another embodiment, a mechanism handles the case in which the adaptive reference model 206 assimilates a snapshot containing an anomaly. Once a model achieves the desired maturity level it undergoes a process that removes anomalies that may have been assimilated. These anomalies are visible in a mature model as isolated exceptions to strong relationships. For example, if file A appears in conjunction with file B in 999 machines but in 1 machine file A is present but file B is missing, the process will assume that the later relationship is anomalous and it will be removed from the model. When the model is subsequently used for checking, any machine containing file A, but not file B, will be flagged as anomalous.

The embodiment of the invention shown in FIG. 2 also includes a response agent library 212. The response agent library 212 allows the service provider to author and store automated responses for specific trouble conditions. These automated responses are constructed from a collection of scripts that can be dispatched to a managed machine to perform actions like replacing a file or changing a registry value. Once a trouble condition has been analyzed and a response agent has been defined, any subsequent occurrence of the same trouble condition should be corrected automatically.

Figure 3:
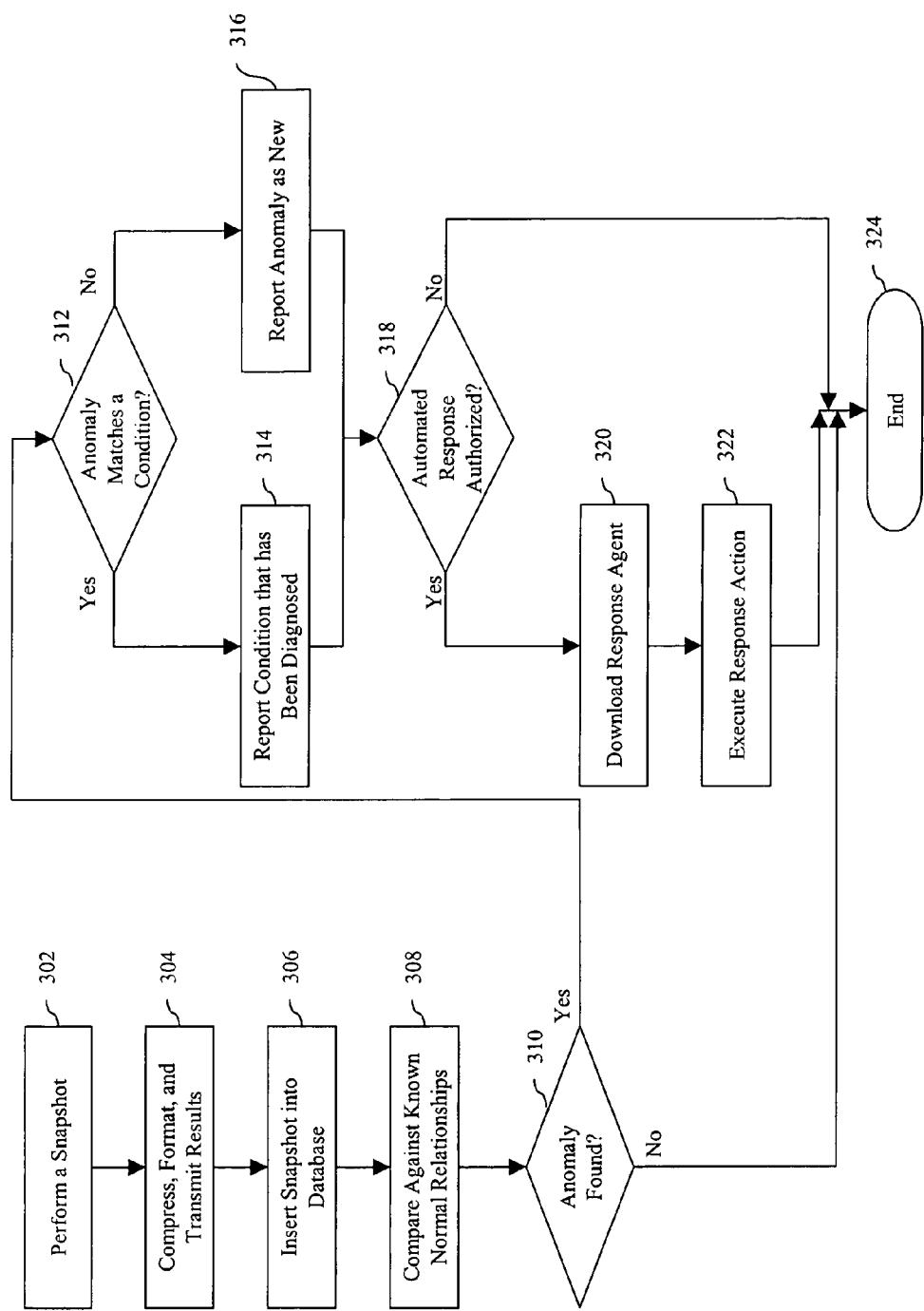
FIG. 3 is a flow chart illustrating an overall process of anomaly detection in one embodiment of the present invention.

FIG. 3 is a flow chart illustrating an overall process of anomaly detection in one embodiment of the present invention. In the embodiment shown, the Agent component (202) performs a snapshot on a periodic basis, e.g., once per day 302. This snapshot involves collecting a massive amount of data and can take anywhere from a few minutes to hours to execute, depending on the configuration of the client. When the scan is complete the results are compressed, formatted, and transmitted in the form of a snapshot to a secure server known as the Collector component 304. The Collector component acts as a central repository for all of the snapshots being submitted from the managed population. Each snapshot is then decompressed, parsed, and stored in various tables in the database by the Collector component The detection function (218) uses the data stored in the adaptive reference model component (206) to check the contents of the snapshot against hundreds of thousands of statistically relevant relationships that are known to be normal for that managed population 308. If no anomaly is found 310, the process ends 324.

If an anomaly is found 310, the Recognition Filters (210) are consulted to determine if the anomaly matches any known conditions 312. If the answer is yes, then the anomaly is reported according to the condition that has been diagnosed 314. Otherwise, the anomaly is reported as an unrecognized anomaly 316. The Recognition Filter (216) also indicates whether or not an automated response has been authorized for that particular type of condition 318.

In one embodiment, the Recognition Filters (216) can recognize and consolidate multiple anomalies. The process of matching Recognition Filters to anomalies is performed after the entire snapshot has been analyzed and all anomalies associated with that snapshot have been detected. If a match is found between a subset of anomalies and a Recognition Filter, the name of the Recognition Filter will be associated with the subset of anomalies in the output stream. For example, the presence of a virus might generate a set of file anomalies, process anomalies, and registry anomalies. A Recognition Filter could be used to consolidate these anomalies so that the user would simply see a descriptive name relating all the anomalies to a likely common cause, i.e. a virus.

If automated response has been authorized, then the response agent library (212) downloads the appropriate response agents to the affected machine 320. The Agent component 202 in the affected machine then executes the sequence of scripts needed to correct the trouble condition 322. The process shown then ends 324.

Embodiments of the present invention substantially reduce the cost of maintaining a population of personal computers and servers. One embodiment accomplishes this objective by automatically detecting and correcting trouble conditions before they escalate to the help desk and by providing diagnostic information to shorten the time required for a support analyst to resolve any problems not addressed automatically.

Anything that reduces the frequency at which incidents occur has a significant positive impact on the cost of computer support. One embodiment of the present invention monitors and adjusts the state of a managed machine so that it is more resistant to threats. Using Policy Templates, service providers can routinely monitor the security posture of every managed system, automatically adjusting security settings and installing software updates to eliminate known vulnerabilities.

In a human-based support model, trouble conditions are detected by end users, reported to a help desk, and diagnosed by human experts. This process accrues costs in a number of ways. First, there is cost associated with lost productivity while the end user waits for resolution. Also, there is the cost of data collection, usually performed by help desk personnel. Additionally, there is the cost of diagnosis, which requires the services of a trained (expensive) support analyst. In contrast, a machine-based support model implemented according to the present invention senses, reports, and diagnoses many software related trouble conditions automatically. The adaptive reference model technology enables detection of anomalous conditions in the presence of extreme diversity and change with a sensitivity and accuracy not previously possible.

In one embodiment of the present invention, to prevent false positives, the system can be configured to operate at various confidence levels, and anomalies that are known to be benign can be filtered out using Recognition Filters. Recognition Filters can also be used to alert the service provider to the presence of specific types of undesirable or malicious software.

In conventional systems, computer incidents are usually resolved by humans through the application of a series of trial and error repair actions. These repair actions tend to be of the "sledge hammer" variety, i.e. solutions that affect far more than the trouble conditions they were intended to correct. Multiple choice repair procedures and sledgehammer solutions are a consequence of an inadequate understanding of the problem and a source of unnecessary cost. Because a system according to the present invention has the data to fully characterize the problem, it can reduce the cost of repair in two ways. First, it can automatically resolve the incident if a Recognition Filter has been defined that specifies the required automated response. Second, if automatic repair is not possible, the system's diagnostic capabilities eliminate the guesswork inherent in the human-based repair process, reducing execution time and allowing greater precision.

Figure 4:
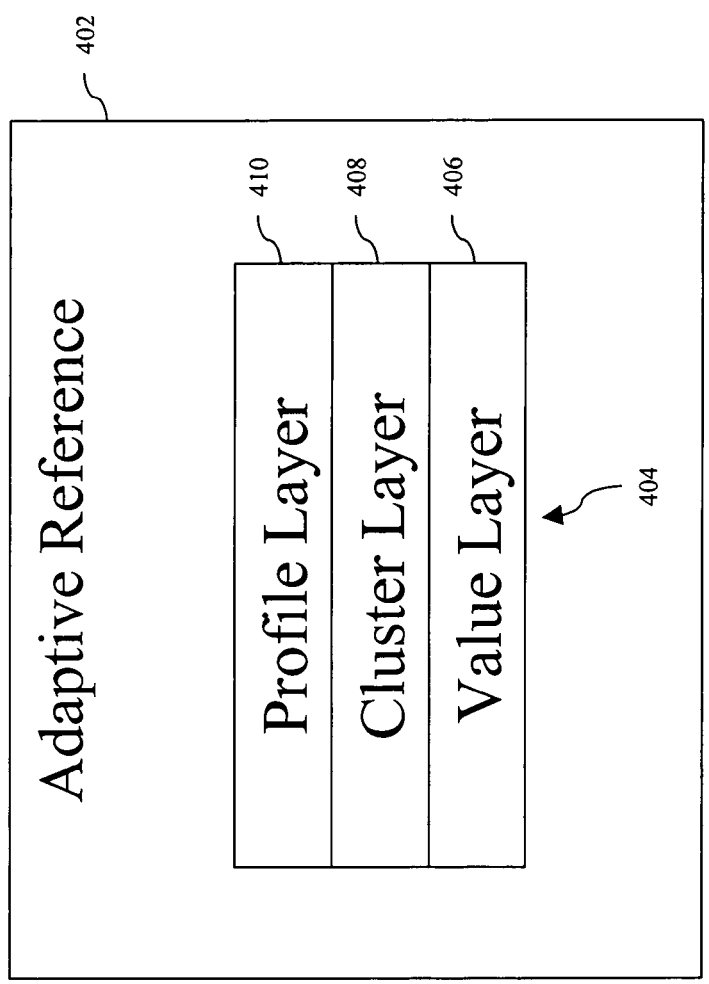
FIG. 4 is a block diagram illustrating components of an adaptive reference model in one embodiment of the present invention.

FIG. 4 is a block diagram illustrating components of an adaptive reference model in one embodiment of the present invention. FIG. 4 is merely exemplary.

The embodiment shown in FIG. 4 illustrates a multi-layer, single-silo adaptive reference model 402. In the embodiment shown, the silo 404 comprises three layers: the value layer 406, the cluster layer 408, and the profile layer 410.

The value layer 406 tracks the values of asset/value pairs provided by the Agent component (202) described herein across the managed population (114) of FIG. 1. When a snapshot is compared to the adaptive reference model 402, the value layer 406 of the adaptive reference model 402 evaluates the value portion of each asset/value pair contained therein. This evaluation consists of determining whether any asset value in the snapshot violates a statistically significant pattern of asset values within the managed population as represented by the adaptive reference model 402.

For example, an Agent (116*b*) transfers a snapshot that includes a digital signature for a particular system file. During the assimilation process (when the adaptive reference model is being constructed) the model records the values that it encounters for each asset name and the number of times that that value is encountered. Thus, for every asset name, the model knows the "legal" values that it has seen in the population. When the model is used for checking, the value layer 406 determines if the value of each attribute in the snapshot matches one of the "legal" values in the model. For example, in the case of a file, a number of "legal" values are possible because various versions of the file might exist in the managed population. An anomaly would be declared if the model contained one or more file values that were statistically consistent and the snapshot contained a file value that did not match any of the file values in the model. The model can also detect situations where there is no "legal" value for an attribute. For example, log files don't have a legal value since they change frequently. If no "legal" value exists, then the attribute value in the snapshot will be ignored during checking.

In one embodiment, adaptive reference model 402 implements criteria to ensure than an anomaly is truly an anomaly and not just a new file variant. The criteria may include a confidence level. Confidence levels do not stop a unique file from being reported as an anomaly. Confidence levels constrain the relationships used in the model during the checking process to those relationships that meet certain criteria. The criteria associated with each level are designed to achieve a certain statistical probability. For example, in one embodiment, the criteria for the high confidence level are designed to achieve a statistical probability of greater than 90%. If a lower confidence level is specified, then additional relationships that are not as statistically reliable are included in the checking process. The process of considering viable, but less likely, relationships is similar to the human process of speculating when we need to make a decision without all the information that would allow us to be certain. In a continuously changing environment, the administrator may wish to filter out the anomalies associated with low confidence levels, i.e., the administrator may wish to eliminate as many false positives as possible.

In an embodiment that implements the confidence level, if a user reports that something is wrong with a machine, but the administrator is unable to see any anomalies at the default confidence level, the administrator can lower the confidence level, enabling the analysis process to consider relationships that have lower statistical significance and are ignored at higher confidence levels. By reducing the confidence level, the administrator allows the adaptive reference model 402 to include patterns that may not have enough samples to be statistically significant but might provide clues as to what the problem is. In other words, the administrator is allowing the machine to speculate.

In another embodiment, the value layer 406 automatically eliminates asset values from the adaptive reference model 402 if, after assimilating a specified number of snapshots, the asset values have failed to exhibit any stable pattern. For example, many applications generate log files. The values of log files constantly change and are rarely the same from machine to machine. In one embodiment, these file values are evaluated initially and then after a specified number of evaluations, they are eliminated from the adaptive reference model 402. By eliminating these types of file values from the model 402, the system eliminates unnecessary comparisons during the detection process 218 and reduces database storage requirements by pruning out low value information.

An embodiment of the present invention is not limited to eliminating asset values from the adaptive reference model 402. In one embodiment, the process also applies to the asset names. Certain asset names are "unique by nature", that is they are unique to a particular machine but they are a byproduct of normal operation. In one embodiment, a separate process handles unstable asset names. This process in such an embodiment identifies asset names that are unique by nature and allows them to stay in the model so that they are not reported as anomalies.

The second layer shown in FIG. 4 is the cluster layer 408. The cluster layer 408 tracks relationships between asset names. An asset name can apply to a variety of entities including a file name, a registry key name, a port number, a process name, a service name, a performance counter name, or a hardware characteristic. When a particular set of asset names is generally present in tandem on the machines in a managed population (114), the cluster layer 408 is able to flag an anomaly when a member of the set of asset names is absent.

For example, many applications on a computer executing a Microsoft Windows operating system require a multitude of dynamic link libraries (DLL). Each DLL will often depend on one or more other DLL's. If the first DLL is present, then the other DLL's must be present as well. The cluster layer 408 tracks this dependency and if one of the DLL's is missing or altered, the cluster layer 408 alerts the administrator that an anomaly has occurred.

The third layer in the adaptive reference model 402 shown in FIG. 4 is the profile layer 410. The profile layer 410 in the embodiment shown detects anomalies based on violations of cluster relationships. There are two types of relationships, associative (the clusters appear together) and exclusionary (the clusters never appear together). The profile layer 410 allows the adaptive reference model to detect missing assets not detected by the cluster layer as well as conflicts between assets. The profile layer 410 determines which clusters have strong associative and exclusionary relationships with one another. In such an embodiment, if a particular cluster is not detected in a snapshot where it would normally be expected by virtue of the presence of other clusters with which it has strong associative relationships, then the profile layer 410 detects the absence of that cluster as an anomaly. Likewise, if a cluster is detected in a snapshot where it would not normally be expected because of the presence of other clusters with which it has strong exclusionary relationships, then the profile layer 410 detects the presence of the first cluster as an anomaly. The profile layer 410 allows the adaptive reference model 402 to detect anomalies that would not be detectable at the lower levels of the silo 404.

The adaptive reference model 402 shown in FIG. 4 may be implemented in various ways that are well known to those skilled in the art. By optimizing the processing of the adaptive reference model 402 and by providing sufficient processing and storage resources, an embodiment of the present invention is able to support an unlimited number of managed populations and individual clients. Both the assimilation of a new model and the use of the model in checking involve the comparison of hundreds of thousands of attribute names and values. Performing these comparisons using the text strings for the names and values is a very demanding processing task. In one embodiment of the present invention, every unique string in an incoming snapshot is assigned an integer identifier. The comparisons are then performed using the integer identifiers rather than the strings. Because computers can compare integers much faster than the long strings associated with file names or registry key names, processing efficiency is greatly enhanced.

The adaptive reference model 402 relies on data from the Agent component (202). The functionality of the Agent component (202) is described above, which is a functional summary of the user interface and the Agent component (202) in one embodiment of the present invention.

An embodiment of the present invention is able to compare registry entries across the client machines in a managed population. One difficulty in comparing registry keys across different machines running a Microsoft Windows operating system derives from the use of a Global Unique Identifier ("GUID"). A GUID for a particular item on one machine may differ from the GUID for the same item on a second machine. Accordingly, an embodiment of the present system provides a mechanism for normalizing the GUID's for comparison purposes.

Figure 5:
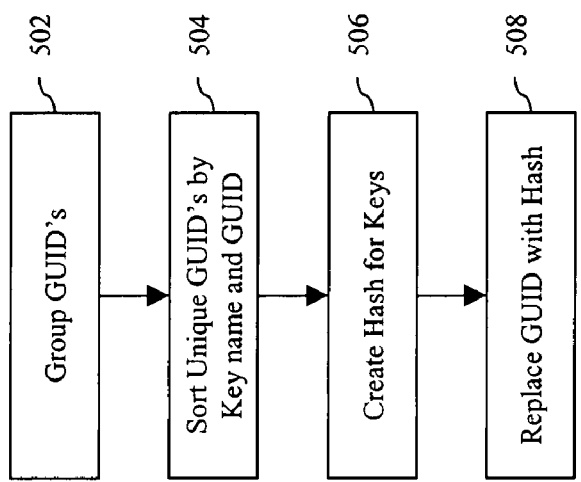
FIG. 5 is a flow chart illustrating a process of normalizing registry information on a agent in one embodiment of the present invention.

FIG. 5 is a flow chart illustrating a process of normalizing registry information on a client in one embodiment of the present invention. In the embodiment shown, the GUID's are first grouped into two groups 502. The first group is for GUID's that are non-unique (duplicated) across machines in the managed population. The second group includes GUID's that are unique across machines, i.e., the same key has a different GUID on different machines within the managed population. The keys for the second group are next sorted 504. In this way, the relationship among two or more keys within the same machine can be identified. The intent is to normalize such relationships in a way that will allow them to be compared across multiple machines.

The embodiment shown next creates a hash for the values in the keys 506. This creates a unique signature for all the names, pathnames, and other values contained in the key. The hash is then substituted for the GUID 508. In this manner, uniqueness is maintained within the machine, but the same hash appears in every machine so that the relationship can be identified. The relationship allows the adaptive reference model to identify anomalies within the managed population.

For example, conventional viruses often change registry keys so that the infected machine will run the executable that spreads the virus. An embodiment of the present invention is capable of identifying the changes to the registry in one or more machines of the population due to its ability to normalize registry keys.

Figure 6:
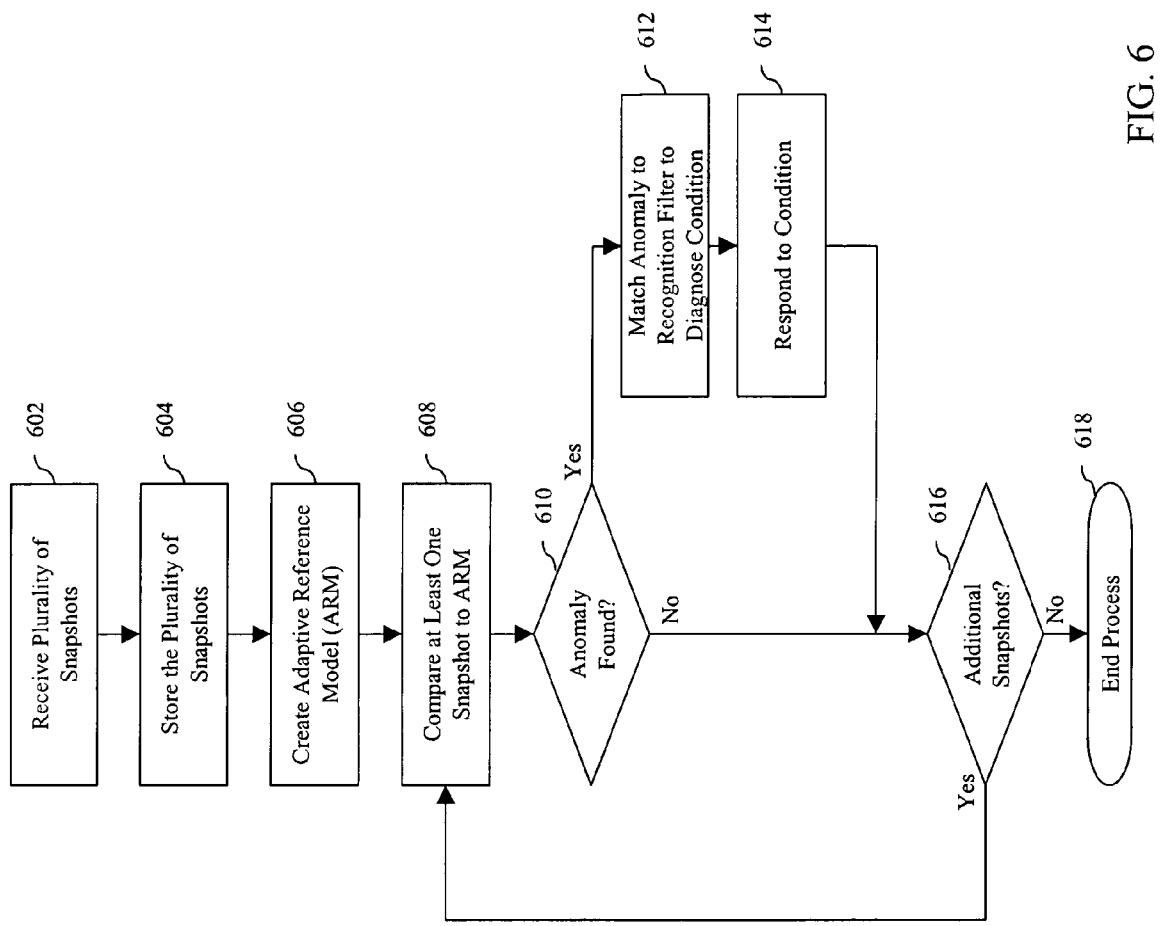
FIG. 6 is a flow chart illustrating a method for identifying and responding to an anomaly in one embodiment of the present invention.

FIG. 6 is a flow chart illustrating a method for identifying and responding to an anomaly in one embodiment of the present invention. In the embodiment shown, a processor, such as the Collector component (108), receives a plurality of snapshots from a plurality of computers 602. Although the following discussion describes the process shown in FIG. 6 as being performed by the Analytic component (110), any suitable processor may perform the process shown. The plurality of snapshots may comprise as few as two snapshots from two computers. Alternatively, the plurality of snapshots may comprise thousands of snapshots. The snapshots comprise data about computers in a population to be examined. For example, the plurality of snapshots may be received from each of the computers in communication with an organization's local area network. Each snapshot comprises a collection of asset/value pairs that represent the state of a computer at a particular point in time.

As the Collector component (108) receives the snapshots, it stores them 604. Storing the snapshots may comprise storing them in a data store, such as in database (112) or in memory (not shown). The snapshots may be stored temporarily or permanently. Also, in one embodiment of the present invention, the entire snapshot is stored in a data store. In another embodiment, only the portions of the snapshot that have changed from a prior version are stored (i.e., a delta snapshot).

The Analytic component (110) utilizes the data in the plurality of snapshots to create an adaptive reference model 606. Each of the snapshots comprises a plurality of assets, which comprise a plurality of pairs of asset names and asset values. An asset is an attribute of a computer, such as a file name, a registry key name, a performance parameter, or a communication port. The assets reflect a state of a computer, actual or virtual, within the population of computers analyzed. An asset value is the state of an asset at a particular point in time. For example, for a file, the value may comprise an MD5 hash that represents the contents of the file; for a registry key, the value may comprise a text string that represents the data assigned to the key.

The adaptive reference model also comprises a plurality of assets. The assets of the adaptive reference model may be compared to the assets of a snapshot to identify anomalies and for other purposes. In one embodiment, the adaptive reference model comprises a collection of data about various relationships between assets that characterize one or more normal computers at a particular point in time.

In one embodiment, the Analytic component (110) identifies a cluster of asset names. A cluster comprises one or more non-overlapping groups of asset names that appear together. The Analytic component (110) may also attempt to identify relationships among the clusters. For example, the Analytic component (110) may compute a matrix of probabilities that predict, given the existence of a particular cluster in a snapshot, the likelihood of the existence of any other cluster in the snapshot. Probabilities that are based on a large number of snapshots and are either very high (e.g. greater than 95%) or very low (e.g. less than 5%) can be used by the model to detect anomalies. Probabilities that are based on a small number of snapshots, (i.e. a number that is not statistically significant) or that are neither very high nor very low are not used to detect anomalies.

The adaptive reference model may comprise a confidence criterion for determining when a relationship can be used to test a snapshot. For example, the confidence criterion may comprise a minimum threshold for a number of snapshots contained in the adaptive reference model. If the threshold is not exceeded, the relationship will not be used. The adaptive reference may also or instead comprise a minimum threshold for a number of snapshots contained in the adaptive reference model that include the relationship, utilizing the relationship only if the threshold is exceeded. In one embodiment, the adaptive reference model comprises a maximum threshold for a ratio of the number of different asset values to the number of snapshots containing the asset values. The adaptive reference model may comprise one or more minimum and maximum thresholds associated with numeric asset values.

Each of the plurality of assets in the adaptive reference model or in a snapshot may be associated with an asset type. The asset type may comprise, for example, a file, a registry key, a performance measure, a service, a hardware component, a running process, a log, and a communication port. Other asset types may also be utilized by embodiments of the present invention. In order to conserve space, the asset names and asset values may be compressed. For instance, in one embodiment of the present invention, the Collector component (108) identifies the first occurrence of an asset name or asset value in one of the plurality of snapshots and generates an identifier associated with that first occurrence. Subsequently, if the Collector component (108) identifies a second occurrence of the asset name or asset value, the Collector component (108) associates the identifier with the second asset name and asset value. The identifier and asset name or asset value can then be stored in an index, while only the identifier is stored with the data in the adaptive reference model or snapshot. In this way, space necessitated to store frequently repeated asset names or values is minimized.

Figure 11:
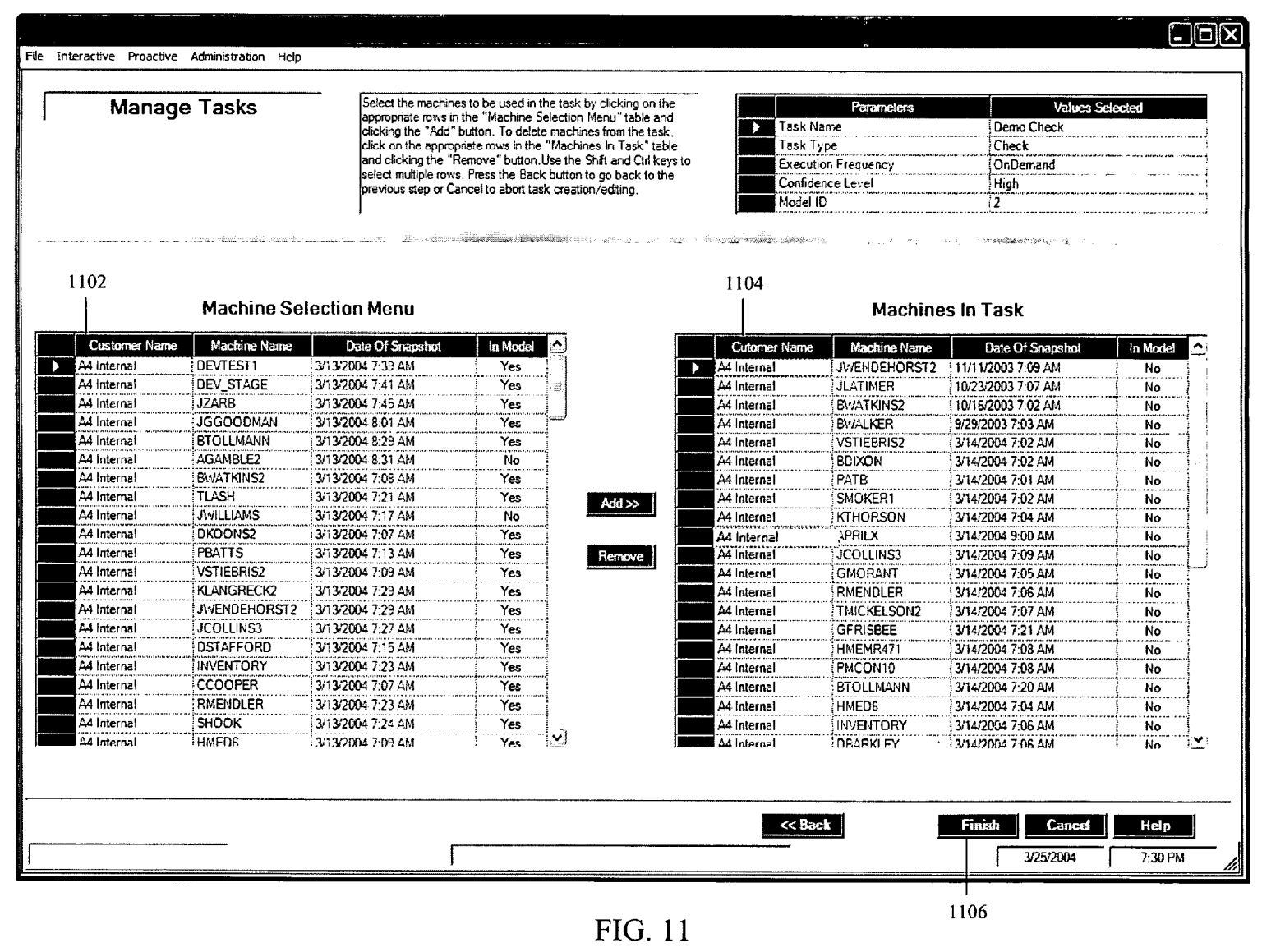
Figure 12:
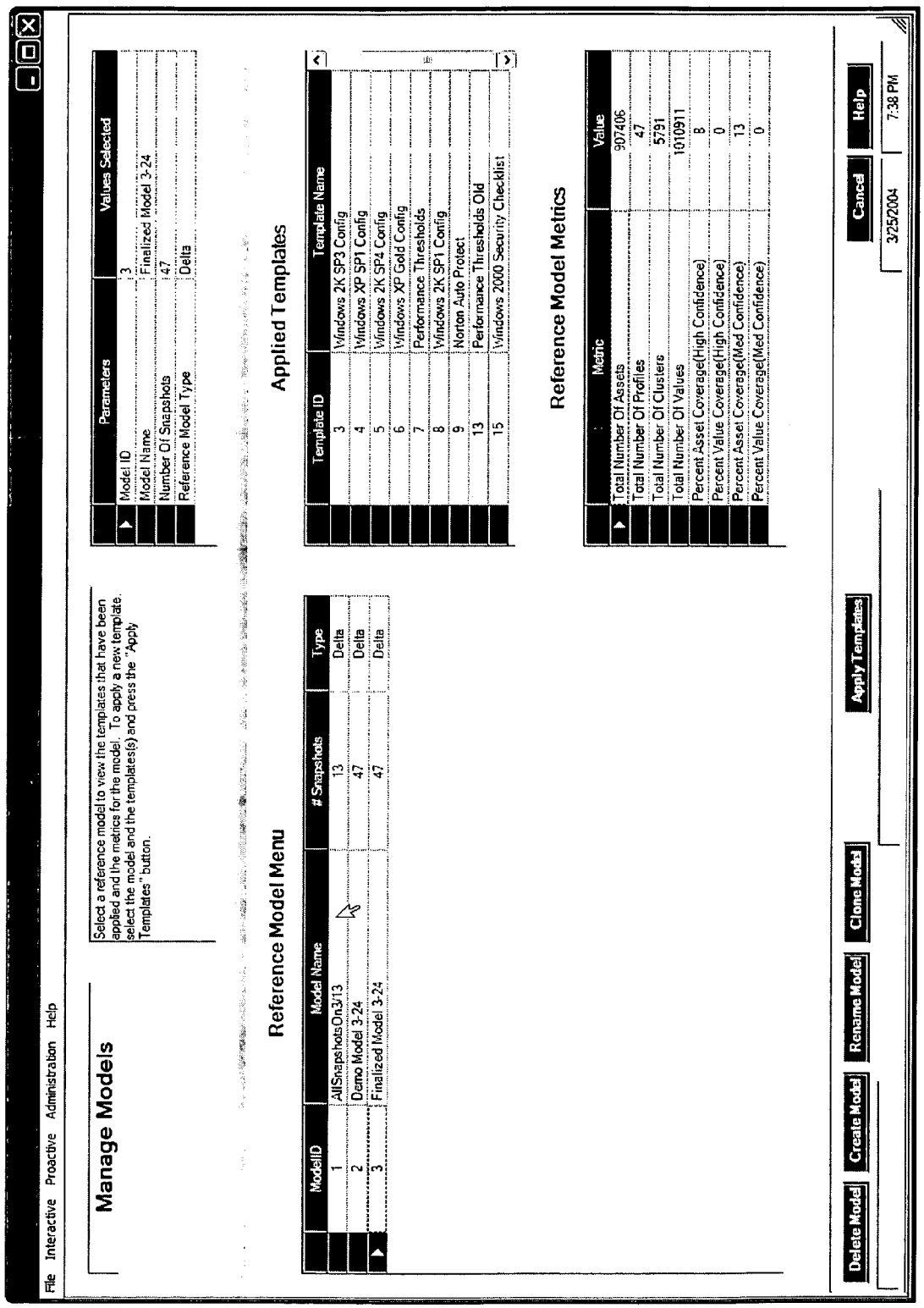
FIG. 12 is a screen shot of a user interface for managing an adaptive reference model in one embodiment of the present invention.

The adaptive reference model may be automatically generated. In one embodiment, the adaptive reference model is generated automatically and then manually revised to account for knowledge of technical support personnel or others. FIG. 11 is a screen shot of a user interface for creating an adaptive reference model in one embodiment of the present invention. In the embodiment shown, a user selects the snapshots to be included in the model by moving them from the Machine Selection Menu window 1102 to the Machines in Task window 1104. When the user completes the selection process and clicks the Finish button 1106 an automated task is created that causes the model to be generated. Once the model has been created, the user can use another interface screen to manage it. FIG. 12 is a screen shot of a user interface for managing an adaptive reference model in one embodiment of the present invention.

Referring again to FIG. 6, once the adaptive reference model has been created, the Analytic component (110) compares at least one of the plurality of snapshots to the adaptive reference model 608. For example, the Collector component (108) may receive and store in the Database component (112) one hundred snapshots. The Analytic component (110) uses the one hundred snapshots to create an adaptive reference model. The Analytic component (110) then begins comparing each of the snapshots in the plurality of snapshots to the adaptive reference model. At some time later the Collector component (108) may receive 100 new snapshots from the Agent components, which can then be used by the Analytic component to generate a revised version of the adaptive reference model and to identify anomalies.

In one embodiment of the present invention, the comparison of one or more snapshots to an adaptive reference model comprises examining relationships among asset names. For instance, the probability of existence for a first asset name may be high when a second asset name is present. In one embodiment, the comparison comprises determining whether all of the asset names in a snapshot exist within the adaptive reference model and are consistent with a plurality of high probability relationships among asset names.

Referring still to FIG. 6, in one embodiment, the Analytic component (110) compares the snapshot to the adaptive reference model in order to identify any anomalies that may be present on a computer 610. An anomaly is an indication that some portion of a snapshot deviates from normal as defined by the adaptive reference model. For example, an asset name or value may deviate from the normal asset name and asset value expected in particular situation as defined by an adaptive reference model. The anomaly may or may not signal that a known or new trouble or problem condition exists on or in relation to the computer with which the snapshot is associated. A condition is a group of anomalies that are related. For example, a group of anomalies may be related because they arise from a single root cause. For example, an anomaly may indicate the presence of a particular application on a computer when that application is not generally present on the other computers within a given population. Recognition of anomalies may also be used for functions such as capacity balancing. For instance, by evaluating performance measures of several servers, the Analytic component (110) is able to determine when to trigger the automatic deployment and configuration of a new server to address changing demands.

A condition comprises a group of related anomalies. For example, a group of anomalies may be related because they arise from a single root cause, such as installation of an application program or the presence of a "worm." A condition may comprise a condition class. The condition class allows various conditions to be grouped with one another.

In the embodiment shown in FIG. 6, if an anomaly is found, the Analytic component (110) attempts to match the anomaly to a recognition filter in order to diagnose a condition 612. The anomaly may be identified as a benign anomaly in order to eliminate noise during analysis, i.e., in order to avoid obscuring real trouble conditions because of the presence of anomalies that are the result of normal operating processes. A check is a comparison of a snapshot to an adaptive reference model. A check may be automatically performed. The output of a check may comprise a set of anomalies and conditions that have been detected. In one embodiment, the anomaly is matched to a plurality of recognition filters. A recognition filter comprises a signature of a condition or of a class of conditions. For example a recognition filter may comprise a collection of pairs of asset names and values that, when taken together, represent the signature of a condition that is desirable to recognize, such as the presence of a worm. A generic recognition filter may provide a template for creating more specific filters. For example, a recognition filter that is adapted to search for worms in general may be adapted to search for a specific worm.

In one embodiment of the present invention, a recognition filter comprises at least one of: an asset name associated with the condition, an asset value associated with the condition, a combination of asset name and asset value associated with the condition, a maximum threshold associated with an asset value and with the condition, and a minimum threshold associated with an asset value and with the condition. Asset name/value pairs from a snapshot may be compared to the name/value pairs from the recognition filter to find a match and diagnose a condition. The name/value matching may be exact or the recognition filter may comprise a wildcard, allowing a partial value to be entered in the recognition filter and then matched with the snapshot. A particular asset name and/or value may be matched to a plurality of recognition filters in order to diagnose a condition.

A recognition filter may be created in various ways. For example, in one embodiment of the present invention, a user copies the anomalies from a machine where the condition of interest is present. The anomalies may be presented in an anomaly summary from which they can be selected and copied to the filter. In another embodiment, a user enters a wildcard character in a filter definition. For example, one piece of spyware called Gator generates thousands of registry keys that start with the string "hklm\software\gator". An embodiment of the present invention may provide a wildcard mechanism to efficiently deal with this situation. The wildcard character may be, for example, the percent sign (%), and may be used before a text string, after a text string, or in the middle of a text string. Continuing the Gator example, if the user enters the string "hklm\software\gator\%" in the filter body, then any key starting with "hkml\software\gator" will be recognized by the filter. The user may wish to construct a filter for a condition that has not yet been experienced in the managed population. For example, a filter for a virus based on publicly available information on the Internet rather than an actual instance of the virus within the managed population. To address this situation the user enters the relevant information directly into a filter.

Figure 13:
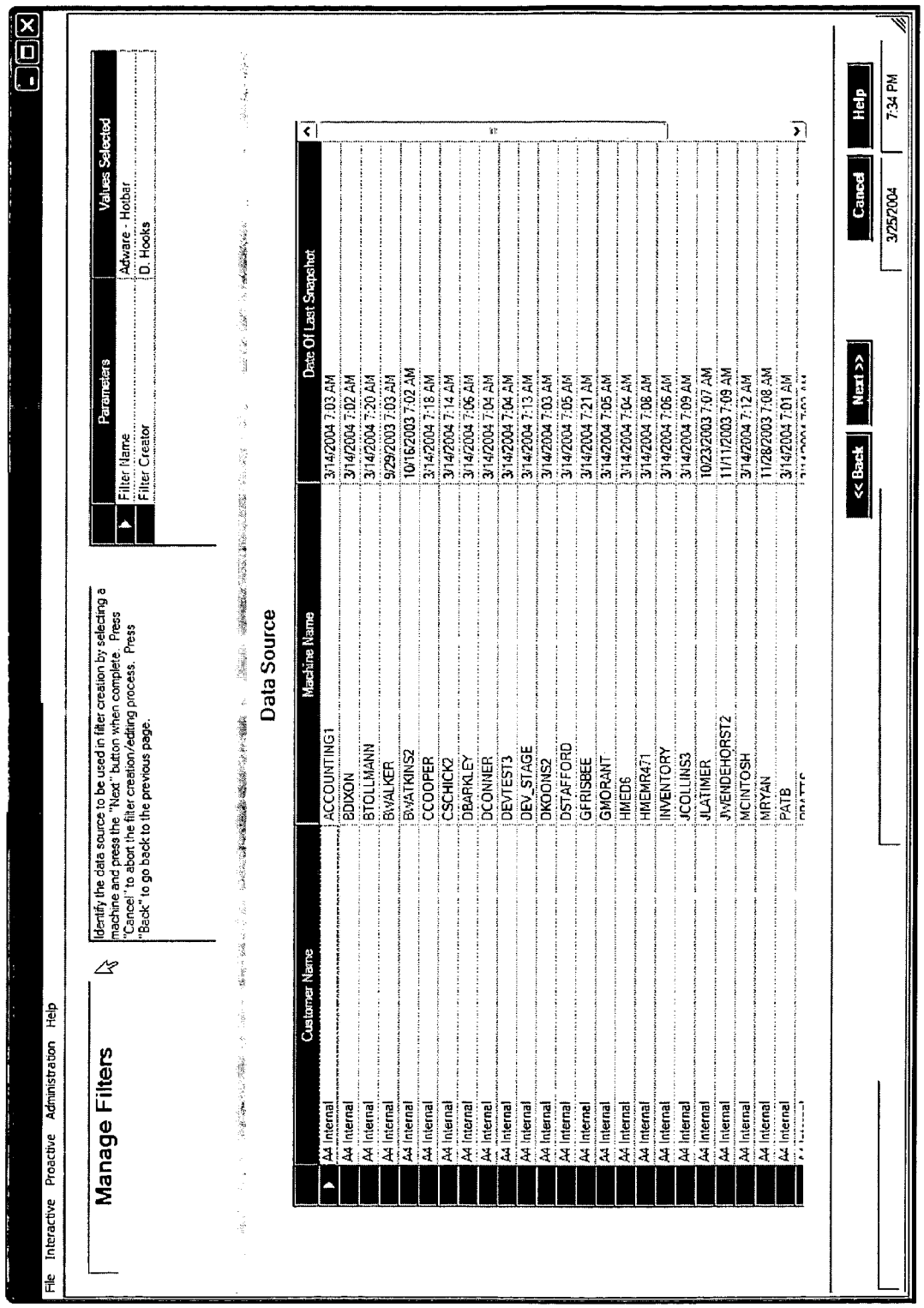
FIG. 13 is a screen shot of a user interface for selecting a snapshot to use for creation of a recognition filter in one embodiment of the present invention.
Figure 14:
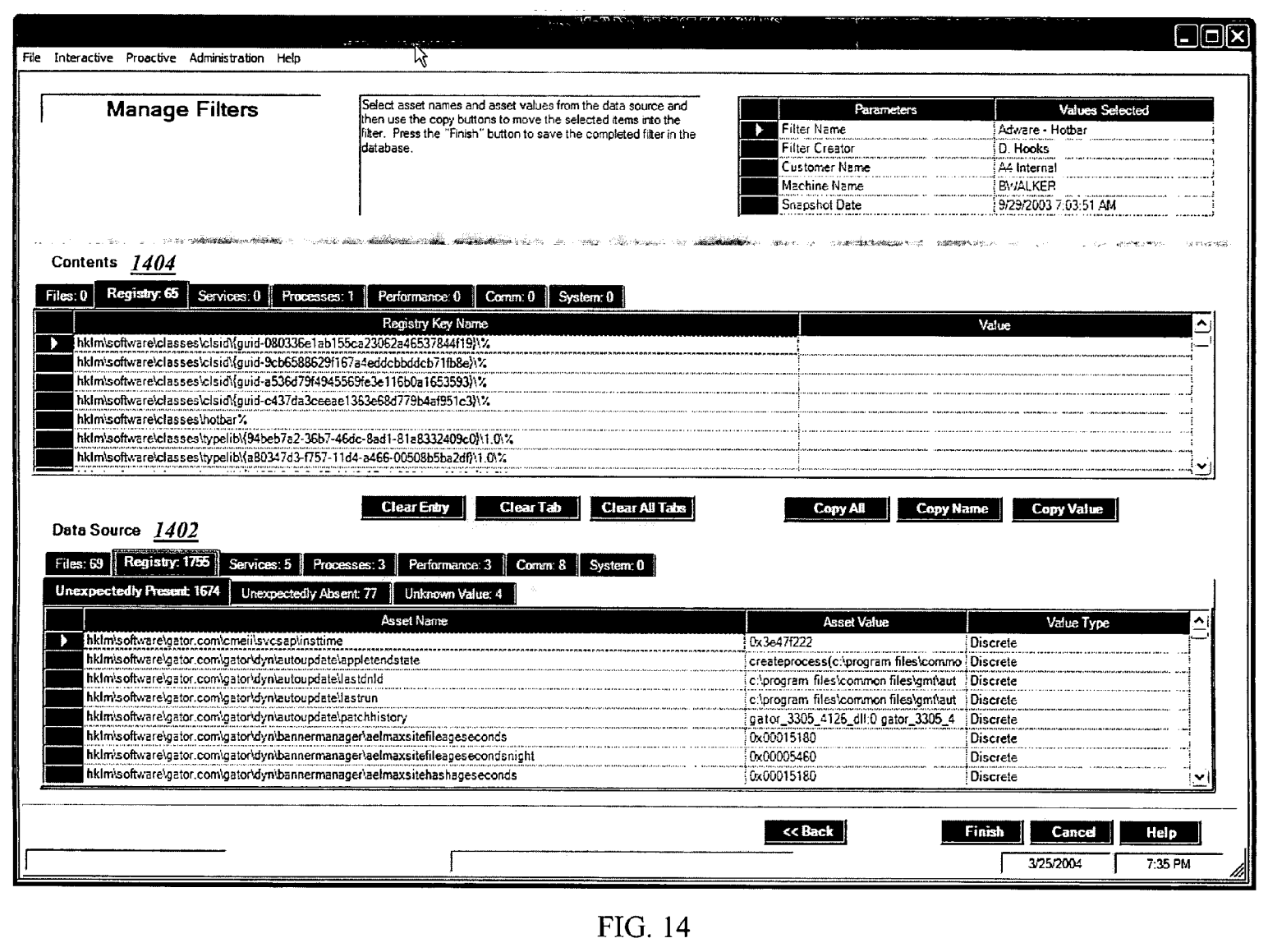

FIG. 13 is a screen shot of a user interface for selecting a snapshot to use for creation of a recognition filter in one embodiment of the present invention. A user accesses the screen shot shown to select snapshots to be used to create the recognition filter. FIG. 14 is a screen shot of a user interface for creating or editing a recognition filter in one embodiment of the present invention. In the embodiment shown, assets from the snapshot selected in the interface illustrated in FIG. 13 are displayed in the Data Source window 1402. The user selects these assets and copies them to the Source window 1404 to create the recognition filter.

In one embodiment, the match between a recognition filter and a set of anomalies is associated with a quality measure. For example, an exact match of all of the asset names and asset values in the recognition filter with asset names and asset values in the set of anomalies may be associated with a higher quality measure than a match of a subset of the asset names and asset values in the recognition filter with asset names and asset values in the set of anomalies.

The recognition filter may comprise other attributes as well. For example, in one embodiment, the recognition filter comprises a control flag for determining whether to include the asset name and the asset value in the adaptive reference model. In another embodiment, the recognition filter comprises one or more textual descriptions associated with one or more conditions. In yet another embodiment, the recognition filter comprises a severity indicator that indicates the severity of a condition in terms of, for example, how much damage it may cause, how difficult it may be to remove, or some other suitable measure.

The recognition filter may comprise fields that are administrative in nature. For example, in one embodiment, the recognition filter comprises a recognition filter identifier, a creator name, and an update date-time.

Still referring to FIG. 6, the Analytic component (110) next responds to the condition 614. Responding to the condition may comprise, for example, generating a notification, such as an email to a support technician, submitting a trouble ticket to a problem management system, requesting permission to take an action, for instance, asking for confirmation from a support technician to install a patch, and removing the condition from at least one of the plurality of computers. Removing the condition may comprise, for example, causing a response agent to be executed in any of the plurality of computers affected by the condition. The condition may be associated with an automatic response. The steps of diagnosing 612 and responding to conditions 614 may be repeated for each condition. Also, the process of finding anomalies 610 may be repeated for each individual snapshot.

In the embodiment shown in FIG. 6, the Analytic component (110) next determines whether additional snapshots are to be analyzed 616. If so, the steps of comparing the snapshot to the adaptive reference model 608, finding anomalies 610, matching the anomalies to a recognition filter to diagnose a condition 612, and responding to the condition 614 are repeated for each snapshot. Once all of the snapshots have been analyzed, the process ends 618.

In one embodiment of the present invention, once the Analytic component (110) has identified a condition, the Analytic component (110) attempts to determine which of the plurality of computers within a population are affected by the condition. For example, the Analytic component (110) may examine the snapshots to identify a particular set of anomalies. The Analytic component (110) may then cause a response to the condition to be executed on behalf of each of the affected computers. For example, in one embodiment, an Agent component (202) resides on each of the plurality of computers. The Agent component (202) generates the snapshot that is evaluated by the Analytic component (110). In one such embodiment, the Analytic component (110) utilizes the Agent component (202) to execute a response program if the Analytic component (110) identifies a condition on one of the computers. In diagnosing a condition, the Analytic component (110) may or may not be able to identify a root cause of a condition.

Figure 7:
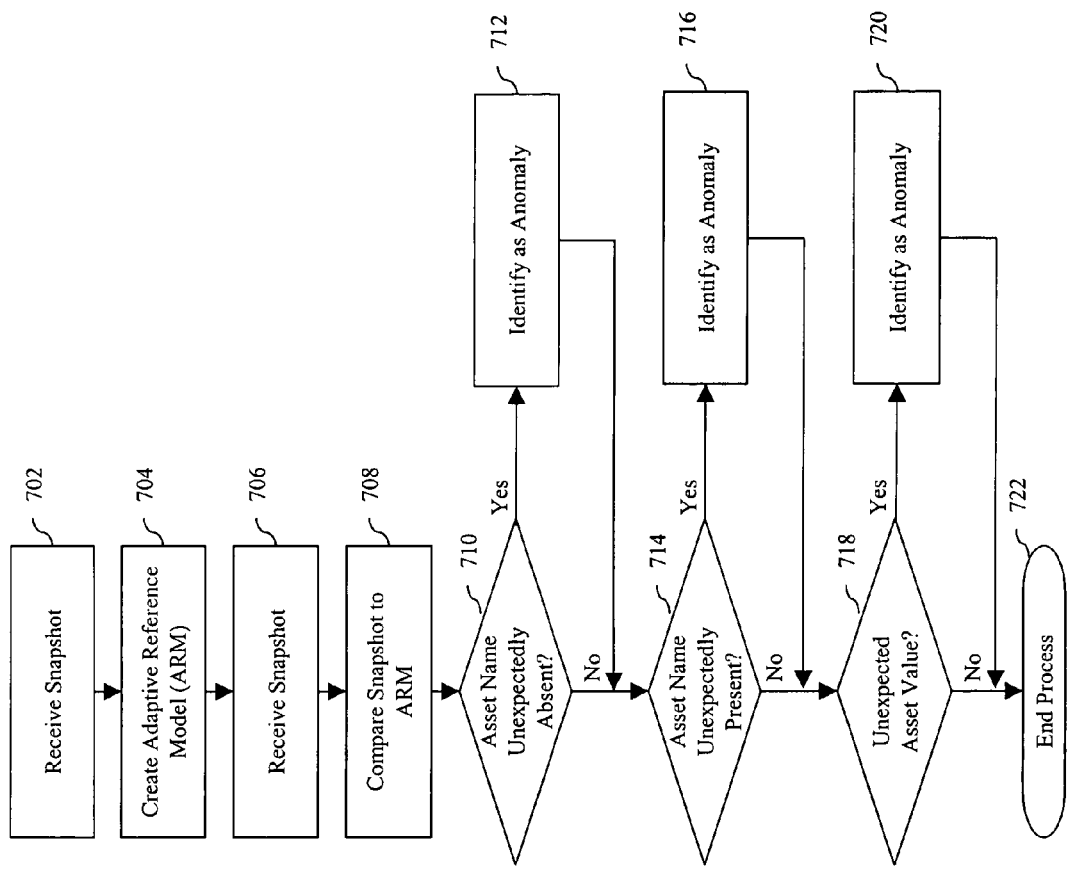
FIG. 7 is a flow chart illustrating a process for identifying certain types of anomalies in one embodiment of the present invention.

FIG. 7 is a flow chart illustrating a process for identifying certain types of anomalies in one embodiment of the present invention. In the embodiment shown, the Analytic component (110) evaluates snapshots for a plurality of computers 702. These snapshots can be base snapshots that comprise the complete state of the computer or delta snapshots that comprise the changes in the state of the computer since the last base snapshot. The Analytic component (110) uses the snapshots to create an adaptive reference model 704. Note that when using delta snapshots for this purpose, the Analytic component must first reconstitute the equivalent of a base snapshot by applying the changes described in the delta snapshot to the most recent base snapshot. The Analytic component (110) subsequently receives a second snapshot (base or delta) for at least one of the plurality of computers 706. The snapshot may be created based on various events, such as the passage of a predetermined amount of time, the installation of a new program, or some other suitable event.

The Analytic component (110) compares the second snapshot to the adaptive reference model to attempt and detect anomalies. Various types of anomalies may exist on a computer. In the embodiment shown, the Analytic component (110) first attempts to identify asset names that are unexpectedly absent 710. For example, all or substantially all of the computers within a population may include a particular file. The existence of the file is noted in the adaptive reference model by the presence of an asset name. If the file is unexpectedly absent from one of the computers within the population, i.e., the asset name is not found, some condition may be affecting the computer on which the file is missing. If the asset name is unexpectedly absent, the absence is identified as an anomaly 712. For example, an entry identifying the computer, date, and unexpectedly absent asset may be entered in a data store.

The Analytic component (110) next attempts to identify asset names that are unexpectedly present 714. The presence of an unexpected asset name, such as a file name or registry entry, may indicate the presence of a trouble condition, such as a computer worm. An asset name is unexpectedly present if it has never been seen before or if it has never been seen before in the context in which it is found. If the asset name is unexpectedly present, the presence is identified as an anomaly 720.

The Analytic component (110) next attempts to identify an unexpected asset value 718. For example, in one embodiment, the Analytic component (110) attempts to identify a string asset value that is unknown for the asset name associated with it. In another embodiment, the Analytic component (110) compares a numerical asset to minimum or maximum thresholds associated with the corresponding asset name. In embodiments of the present invention, the thresholds may be set automatically based upon the mean and standard deviation for asset values within a population. According to the embodiment shown, if an unexpected asset value is detected, it is identified as an anomaly 720. The process then ends 722.

Although the process in FIG. 7 is shown as a serial process, the comparison of a snapshot to the adaptive reference model and the identification of anomalies may occur in parallel. Also, each of the steps depicted may be repeated numerous times. Further, either delta snapshots or base snapshots can be compared to the adaptive reference model during each cycle.

Once an analysis has been completed, the Analytic component (110) may generate a result, such as an anomaly report. This report may further be provided to a user. For instance, the Analytic component (110) may generate a web page comprising the results of a comparison of a snapshot with an adaptive reference model. Embodiments of the present invention may provide a means for performing automated security audits, file and registry integrity checking, anomaly-based virus detection, and automated repair.

Figure 8:
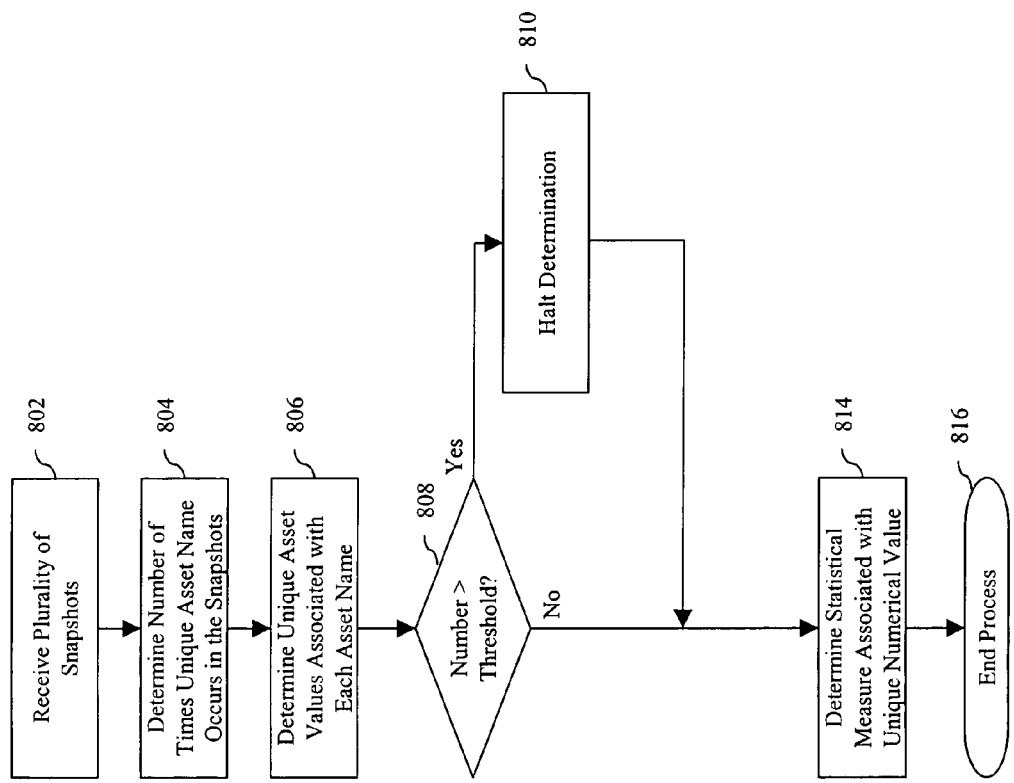
FIG. 8 is a flow chart illustrating a process for generating an adaptive reference model in one embodiment of the present invention.

FIG. 8 is a flow chart illustrating a process for generating an adaptive reference model in one embodiment of the present invention. In the embodiment shown, the Analytic component (110) accesses a plurality of snapshots from a plurality of computers via the Database component. Each of the snapshots comprises a plurality of pairs of asset names and asset values. The Analytic component (110) automatically creates an adaptive reference model that is based, at least in part, on the snapshots.

The adaptive reference model may comprise any of a number of attributes, relationships, and measures of the various asset names and values. In the embodiment shown in FIG. 8, the Analytic component (110) first finds one or more unique asset names and then determines the number of times each unique asset name occurs within the plurality of snapshots 804. For example, a file for a basic operating system driver may occur on substantially all the computers within a population. The file name is a unique asset name; it will appear only once within a snapshot but will likely occur in substantially all of the snapshots.

In the embodiment shown, the Analytic component (110) next determines the unique asset values associated with each asset name 806. For example, the file name asset for the driver described in relation to step 804 will likely have the same value for every occurrence of the file name asset. In contrast, the file value for a log file will likely have as many different values as occurrences, i.e., a log file on any particular computer will contain a different number of entries from every other computer in a population.

Since the population may be very large, in the embodiment shown in FIG. 8, if the number of unique values associated with an asset name exceeds a threshold 808, the determination is halted 810. In other words, in the example of the log file described above, whether or not the computer is in a normal state does not depend on a log file having a consistent value. The log file contents are expected to vary on each computer. Note however that the presence or absence of the log file may be stored in the adaptive reference model as an indication of normalcy or of an anomaly.

In the embodiment shown in FIG. 8, the Analytic component (110) next determines the unique string asset values associated with each asset name 812. For example, in one embodiment, there are only two types of asset values, strings and numbers. File hashes and registry key values are examples of strings; a performance counter value is an example of a number.

The Analytic component (110) next determines a statistical measure associated with unique numerical values associated with an asset name 814. For example, in one embodiment, the Analytic component (110) captures a performance measure, such as memory paging. If one computer in a population often pages memory, it may be an indication that a rogue program is executing in the background and requiring substantial memory resources. However, if every or a sizeable number of computers in a population often page memory, it may indicate that the computers are generally lacking in memory resources. In one embodiment, the Analytic component (110) determines a mean and a standard deviation for numerical values associated with a unique asset name. In the memory example, if the measure of memory paging for one computer falls far outside the statistical mean for the population, an anomaly may be identified.

In one embodiment of the present invention, the adaptive reference model may be modified by applying a policy template. A policy template is a collection of asset/value pairs that are identified and applied to an adaptive reference model to establish a norm that reflects a specific policy. For example, the policy template may comprise a plurality of pairs of asset names and asset values that is expected to be present in a normal computer. In one embodiment, applying the policy template comprises modifying the adaptive reference model so that the pairs of asset names and asset values present in the policy template appear to have been present in each of the plurality of snapshots, i.e., appear to be the normal state of a computer in the population.

Figure 16:
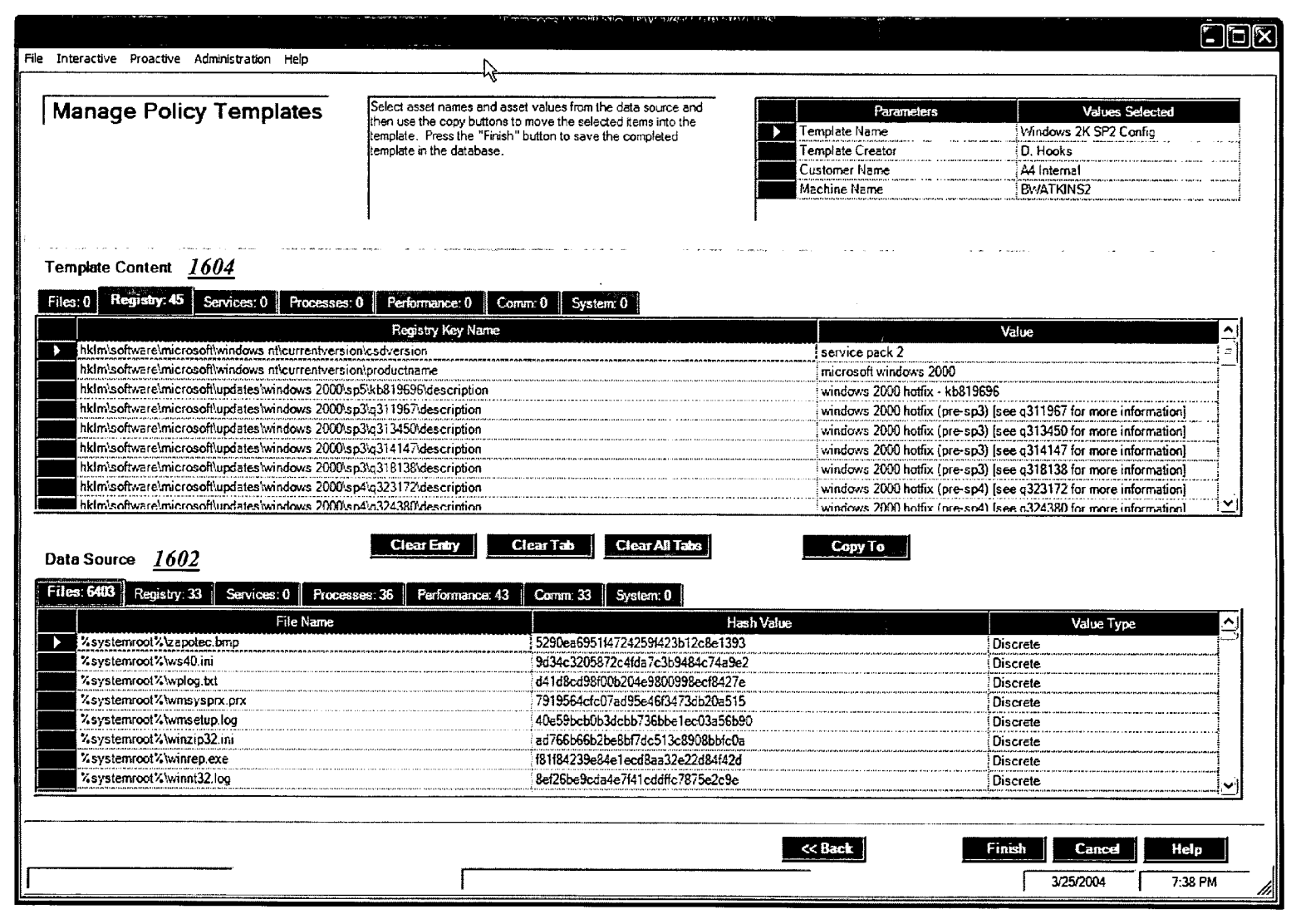

FIG. 15 is a screen shot illustrating a user interface for selecting a "golden system" for use in a policy template in one embodiment of the present invention. As described above, the user first selects the golden system on which the policy template is to be based. FIG. 16 is a screen shot of a user interface for selecting policy template assets in one embodiment of the present invention. As with the user interface for creating recognition filters. The user selects assets from a Data Source window 1602 and copies them to a contents window, the Template contents window 1604.

Figure 9:
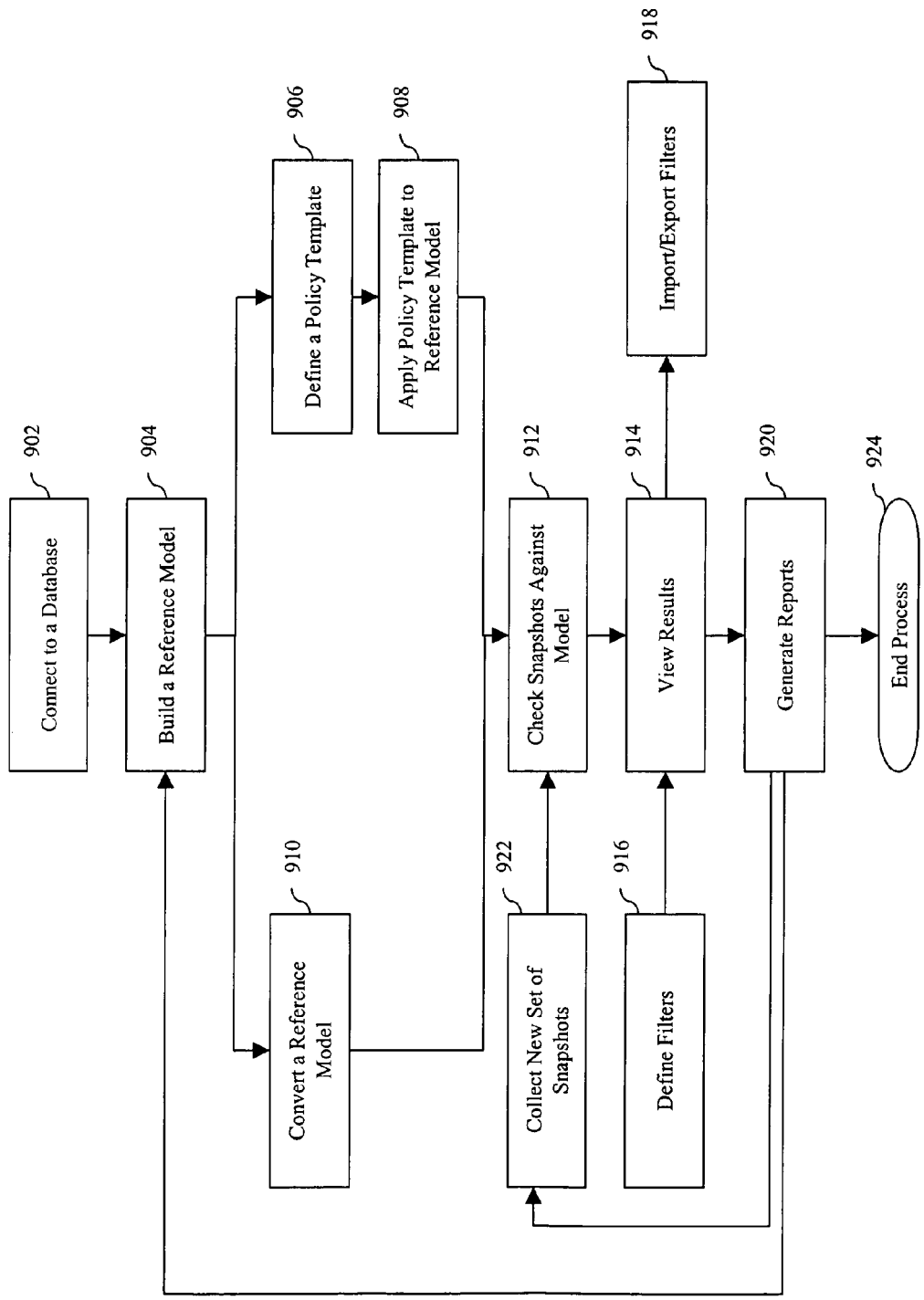
FIG. 9 is a flow chart, illustrating a process for proactive anomaly detection in one embodiment of the present invention.

FIG. 9 is a flow chart, illustrating a process for proactive anomaly detection in one embodiment of the present invention. In the embodiment shown, when analysis occurs, the Analytic component (110) establishes a connection to the database (112) that stores snapshots to be analyzed 902. In the embodiment shown, only one database is utilized. However, in other embodiments, data from multiple databases may be analyzed.

Before diagnostic checks are executed, one or more reference models are created 904. Reference models are updated periodically, e.g., once per week, to ensure that the information that they contain remains current. One embodiment of the present invention provides a task scheduler that allows model creation to be configured as a completely automated procedure.

Once a reference model has been created it can be processed in various ways to enable different types of analysis. For example, it is possible to define a policy template 906 as described above. For example, a policy template may require that all machines in a managed population have anti-virus software installed and operational. Once a policy template has been applied to a model, diagnostic checks against that model will include a test for policy compliance. Policy templates can be used in a variety of applications including automated security audits, performance threshold checking, and Windows update management. A policy template comprises the set of assets and values that will be forced into the model as the norm. In one embodiment, the template editing process is based on a "golden system" approach. A golden system is one that exhibits the assets and values that a user wishes to incorporate into the template. The user locates the snapshot that corresponds to the golden system and then selects each asset/value pair that the user wishes to include in the template.

In the process shown in FIG. 9, the policy template is then applied to a model to modify its definition of normal 908. This allows the model to be shaped in ways that allow it to check for compliance against user-defined policies as described herein.

A model may also be converted 910. The conversion process alters a reference model. For example, in one embodiment, the conversion process removes from the model any information assets that are unique, i.e. any assets that occur in one and only one snapshot. When a check is executed against a converted model all unique information assets will be reported as anomalies. This type of check is useful in surfacing previously unknown trouble conditions that exist at the time the Agent components are first installed. Converted models are useful in establishing an initial baseline since they expose unique characteristics. For this reason converted models are sometimes called baseline models in embodiments of the present invention.

In another embodiment, the model building process removes from the model any information assets that match a recognition filter, ensuring that known trouble conditions do not get incorporated into the model. When the system is first installed the managed population quite often contains a number of known trouble conditions that have not yet been noticed. It is important to discover these conditions and remove them from the model since otherwise, they will be incorporated into the adaptive reference model as part of the normal state for a machine.

The Agent component (202) takes a snapshot of the state of each managed machine on a scheduled basis 924. The snapshot is transmitted and entered into the database as a snapshot. Snapshots may also be generated on demand or in response to a specific event such as application installation.

In the proactive problem management process shown, a periodic check of the latest snapshots against an up-to-date reference model is performed 912. The output of a periodic check is a set of anomalies, which are displayed to a user as results 914. The results also include any conditions that are identified as a result of matching the anomalies to recognition filters. Recognition filters may be defined as described above 916. The anomalies are passed through the recognition filters for interpretation resulting in a set of conditions. Conditions can range in severity from something as benign as a Windows update to something as serious as a Trojan.

The trouble conditions that can occur in a computer change as the hardware and software components that make up that computer evolve. Consequently, there is a continuous need to define and share new recognition filters as new combinations of anomalies are discovered. Recognition filters can be thought of as a very detailed and structured way to document trouble conditions and as such they represent an important mechanism to facilitate collaboration. The embodiment shown comprises a mechanism for exporting recognition filters to an XML file and importing recognition filters from an XML file.

Once conditions are identified, reports documenting the results of a proactive check are generated 920. The reports may comprise, for example, a summary description of all conditions detected or a detailed description of a particular condition.

Figure 10:
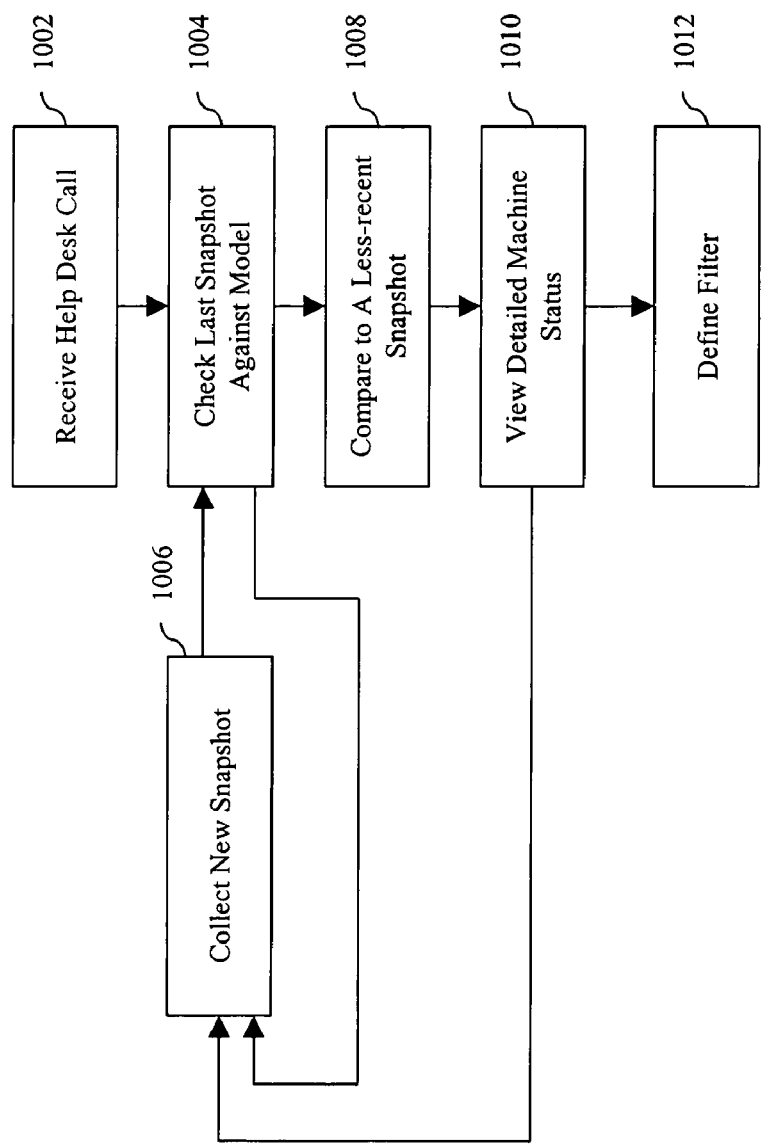
FIG. 10 is a flow chart, illustrating a reactive process for anomaly detection in one embodiment of the present invention.

FIG. 10 is a flow chart, illustrating a reactive process in one embodiment of the present invention. In the process shown in FIG. 10, it is assumed that an adaptive reference model has already been created. The process shown begins when a user calls a help desk to report a problem 1002. In the traditional help desk paradigm the next step would be to verbally collect information about the symptoms being experienced by the user. In contrast, in the embodiment of the present invention shown, the next step is to run a diagnostic check of the suspect machine against the most recent snapshot 1003. If this does not produce an immediate diagnosis of a problem condition, three possibilities may exist: (1) The condition has occurred since the last snapshot was taken; (2) the condition is new and is not being recognized by its filters; or (3) The condition is outside the scope of analysis, e.g. a hardware problem.

If it is suspected that the trouble condition has occurred since the last snapshot was taken then the user may cause the Agent component (202) on the client machine to take another snapshot 1006. Once the resulting snapshot is available, a new diagnostic check can be executed 1004.

If it is suspected that the trouble condition is new, the analyst may execute a compare function that provides a breakdown of the changes in the state of a machine over a specific window of time such as new applications that may have been installed 1008. The user may also view a detailed representation of the state of a machine at various points in time 1010. If the analyst identifies a new trouble condition, the user can identify the set of assets as a recognition filter for subsequent analyses 1012.

While conventional products have focused on enhancing the efficiency of the human-based support model, embodiments of the present invention are designed around a different paradigm, a machine-based support model. This fundamental difference in approach manifests itself most profoundly in the areas of data collection and analysis. Since a machine rather than a human will perform much of the analysis of the data collected, the data collected can be voluminous. For example, in one embodiment, the data collected from a single machine, referred to as the "health check" or snapshot for the machine, includes values for hundreds of thousands of attributes. The ability to collect a large volume of data provides embodiments of the present invention with a significant advantage over conventional systems in terms of the number and variety of conditions that can be detected.

Another embodiment of the present invention provides a powerful analytic capability. The foundation for high value analysis in such an embodiment is the ability to accurately distinguish between normal and abnormal conditions. For example, one system according to the present invention synthesizes its reference model automatically by mining statistically significant relationships from the snapshot data that it collects from its clients. The resulting "adaptive" reference model defines what is normal for that particular managed population at that particular moment in time.

One embodiment of the present invention combines the data collection and adaptive analysis features described above. In such an embodiment, the superior data collection capabilities combined with the analytic power of the adaptive reference model translate into a number of significant competitive advantages, including the capability of providing automatic protection against security threats by conducting daily security audits and checking for software updates to eliminate vulnerabilities. Such an embodiment may also be capable of proactively scanning all managed systems on a routine basis to find problems before they result in lost productivity or calls to the help desk.

An embodiment of the present invention implementing the adaptive reference model capabilities is also able to detect previously unknown trouble conditions. Further, such an embodiment is automatically synthesized and maintained, requiring little or no vendor updates to be effective. Such an embodiment is automatically customized to a particular managed population enabling it to detect failure modes unique to that population.

An additional advantage of an embodiment of the present invention is that in the event that a trouble condition cannot be resolved automatically, such an embodiment can provide a massive amount of structured technical information to facilitate the job of the support analyst.

One embodiment of the present invention provides the capability of automatically repairing an identified problem. Such an embodiment, when combined with the adaptive reference model of the previously described embodiment, is uniquely capable of automated repair because of its ability to identify all aspects of a trouble condition.

Embodiments of the present invention also provide many advantages over conventional systems and methods in terms of the service levels described herein. For example, in terms of the Mass-Healing service level, it is considerably less expensive to prevent an incident than it is to resolve an incident once damage has occurred. Embodiments of the present invention substantially increase the percentage of incidents that can be detected/prevented without the need for human intervention and in a manner that embraces the diverse and dynamic nature of computers in real world environments.

Further, an embodiment of the present invention is able to address the Self-Healing service level by automatically detecting and repairing both known and unknown anomalies. An embodiment implementing the adaptive reference model described herein is uniquely suited to automatic detection and repair. The automatic service and repair also helps to eliminate or at least minimize the need for Self-Service and Deskside Visits.

Embodiments of the present invention provide advantages at the Assisted Service level by providing superior diagnostic capabilities and extensive information resources. An embodiment collects and analyzes massive amounts of end-user data, facilitating a variety of needs associated with the human-based support model including: security audits, configuration audits, inventory management, performance analysis, trouble diagnosis.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method of detecting abnormal system states in computers, comprising:
   receiving snapshots from a plurality of computers within a population of computers, wherein individual snapshots include data indicating a state of a respective computer;
   automatically generating an adaptive reference model comprising a rule set customized to characteristics of the population of computers, the rule set being developed by identifying patterns among the snapshots from the plurality of computers such that the adaptive reference model is indicative of normal states in the computers within the population; and
   comparing a snapshot from at least one of the computers to the adaptive reference model to determine whether an anomaly is present in the state of the at least one of the computers.

2. The method of claim 1, further comprising:
   comparing the anomaly to a recognition filter to diagnose a trouble condition on the at least one of the computers; and
   in the event of a trouble condition, generating an automated response to the trouble condition.

3. The method of claim 2, wherein the automated response is a generic response not specific to a particular asset of the at least one computer, and wherein the method further comprises:
   sending the generic response and a set of anomalies found in the snapshot to the at least one computer, the set of anomalies indicating assets of the at least one computer whose states are anomalous; and
   applying the generic response to the anomalous assets to correct the trouble condition.

4. The method of claim 3, wherein the generic response includes at least one of: installing a missing software component, removing an undesirable software component, and restoring an incorrect registry setting.

5. The method of claim 2, wherein the recognition filter comprises a particular pattern of anomalies that indicates the presence of a particular root cause condition or a generic class of conditions.

6. The method of claim 1, further comprising:
   comparing a plurality of anomalies associated with a particular snapshot with a recognition filter to diagnose a trouble condition; and
   diagnosing a trouble condition on the at least one of the computers in response to at least a subset of the plurality of anomalies matching information in the recognition filter.

7. The method of claim 1, wherein individual snapshots include data associated with at least one of: system files, application files, a registry entry, a performance counter, a process, a communication port, a hardware configuration, a log file, a running task, services, and network connections.

8. The method of claim 1, further comprising:
   inserting rules into the rule set of the adaptive reference model to augment or override rules of the rule set automatically generated from the snapshots.

9. The method of claim 1, wherein the adaptive reference model is generated to include a value layer that determines whether an asset value contained in a snapshot is anomalous.

10. The method of claim 1, wherein the adaptive reference model is generated to include a cluster layer that tracks relationships between assets and identifies an anomaly in response to an asset being unexpectedly absent from or present in a set of assets in a snapshot.

11. The method of claim 1, wherein the adaptive reference model is generated to include a profile layer that identifies anomalies in response to violation of relationships of clusters of assets in a snapshot.

12. A computer readable medium storing instructions, that when executed by a computer, cause the computer to perform functions of:
   receiving snapshots from a plurality of computers within a population of computers, wherein individual snapshots include data indicating a state of a respective computer;
   automatically generating an adaptive reference model comprising a rule set customized to characteristics of the population of computers, the rule set being developed by identifying patterns among the snapshots from the plurality of computers such that the adaptive reference model is indicative of normal states in the computers within the population; and
   comparing a snapshot from at least one of the computers to the adaptive reference model to determine whether an anomaly is present in the state of the at least one of the computers.

13. The computer readable medium of claim 12, further comprising instructions, that when executed, cause the computer to compare the anomaly to a recognition filter to diagnose a trouble condition on the at least one of the computers, and, in the event of a trouble condition, to generate an automated response to the trouble condition.

14. The computer readable medium of claim 13, wherein the automated response is a generic response not specific to a particular asset of the at least one computer, and wherein the computer readable medium further comprises instructions, that when executed, cause the computer to:
   send the generic response and a set of anomalies found in the snapshot to the at least one computer, the set of anomalies indicating assets of the at least one computer whose states are anomalous; and
   apply the generic response to the anomalous assets to correct the trouble condition.

15. The computer readable medium of claim 14, wherein the generic responses include at least one of: installing a missing software component, removing an undesirable software component, and restoring an incorrect registry setting.

16. The computer readable medium of claim 13, wherein the recognition filter comprises a particular pattern of anomalies that indicates the presence of a particular root cause condition or a generic class of conditions.

17. The computer readable medium of claim 12, wherein the instructions for comparing the snapshot to the adaptive reference model include instructions for determining whether an asset value contained in a snapshot is anomalous.

18. The computer readable medium of claim 12, wherein the instructions for comparing the snapshot to the adaptive reference model include instructions for tracking relationships between assets and identifying an anomaly in response to an asset being unexpectedly absent from or present in a set of assets in a snapshot.

19. The computer readable medium of claim 12, wherein the instructions for comparing the snapshot to the adaptive reference model include instructions for identifying anomalies in response to violation of relationships of clusters of assets in a snapshot.

20. The computer readable medium of claim 12, wherein the computer readable medium further comprises instructions, that when executed, cause the computer to:

compare a plurality of anomalies associated with a particular snapshot with a recognition filter to diagnose a trouble condition; and diagnose a trouble condition on the at least one of the computers in response to at least a subset of the plurality of anomalies matching information in the recognition filter.

21. The computer readable medium of claim 12, wherein individual snapshots include data associated with at least one of: system files, application files, a registry entry, a performance counter, a process, a communication port, a hardware configuration, a log file, a running task, services, and network connections.

22. The computer readable medium of claim 12, wherein the computer readable medium further comprises instructions, that when executed, cause the computer to:

insert rules into the rule set of the adaptive reference model to augment or override rules of the rule set automatically generated from the snapshots.

* * * * *